US012232213B2

(12) United States Patent
Wang et al.

(10) Patent No.: US 12,232,213 B2
(45) Date of Patent: Feb. 18, 2025

(54) REPEATER DISCOVERY IN SIDELINK

(71) Applicant: QUALCOMM Incorporated, San Diego, CA (US)

(72) Inventors: Xiaojie Wang, Hillsborough, NJ (US); Navid Abedini, Basking Ridge, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 17/559,856

(22) Filed: Dec. 22, 2021

(65) Prior Publication Data
US 2023/0199466 A1  Jun. 22, 2023

(51) Int. Cl.
*H04W 8/00* (2009.01)
*H04W 56/00* (2009.01)
*H04W 92/18* (2009.01)

(52) U.S. Cl.
CPC ......... *H04W 8/005* (2013.01); *H04W 56/001* (2013.01); *H04W 92/18* (2013.01)

(58) Field of Classification Search
CPC ............... H04W 8/005; H04W 56/001; H04W 92/18; H04W 88/04; H04W 76/15; H04W 76/14
See application file for complete search history.

(56) References Cited

U.S. PATENT DOCUMENTS

| | | | |
|---|---|---|---|
| 2017/0163470 A1* | 6/2017 | Seo | H04W 4/70 |
| 2018/0054237 A1* | 2/2018 | Tseng | H04B 7/026 |
| 2020/0396734 A1* | 12/2020 | Li | H04W 56/0025 |
| 2021/0112590 A1* | 4/2021 | Kim | H04W 74/008 |
| 2021/0211243 A1* | 7/2021 | Wang | H04L 1/1896 |
| 2021/0274546 A1* | 9/2021 | Kung | H04W 72/56 |
| 2022/0078818 A1* | 3/2022 | Sun | H04L 67/535 |
| 2022/0394592 A1* | 12/2022 | Chen | H04W 40/246 |
| 2023/0164536 A1* | 5/2023 | Back | H04W 8/005 370/329 |
| 2023/0170962 A1* | 6/2023 | Ali | H04B 7/15542 370/252 |
| 2023/0199803 A1* | 6/2023 | Kang | H04W 8/005 370/315 |

(Continued)

*Primary Examiner* — Ayaz R Sheikh
*Assistant Examiner* — Mang Boi Thawng
(74) *Attorney, Agent, or Firm* — Loza & Loza, LLP

(57) ABSTRACT

Aspects relate to a base station configured to transmit a message to a sidelink (SL)-repeater, configuring the SL-repeater to transmit sidelink synchronization signal blocks (S-SSBs) including S-SSB index numbers, receive a SL-node identification and a preferred S-SSB index number, and transmit the SL-node identification and the preferred S-SSB index number to the SL-repeater. The base station may be configured to transmit a first message configuring a SL-repeater to broadcast a sidelink discovery message, receive a sidelink discovery report from the SL-repeater identifying discovered SL-node(s), and transmit a second message activating the SL-repeater for sidelink communication with the SL-node(s). Another aspect relates to a SL-repeater configured to: transmit a sidelink discovery message, receive first response(s) from respectively responding SL-node(s), and transmit a report to a base station identifying a change in membership between a first list of the respectively responding SL-node(s) and a second list of previously responding SL-nodes.

30 Claims, 16 Drawing Sheets

(56) References Cited

U.S. PATENT DOCUMENTS

| | | | |
|---|---|---|---|
| 2023/0284116 A1* | 9/2023 | Cheng | H04W 76/30 370/328 |
| 2024/0063958 A1* | 2/2024 | Christoffersson | H04W 72/542 |
| 2024/0147554 A1* | 5/2024 | Liu | H04W 8/20 |

* cited by examiner

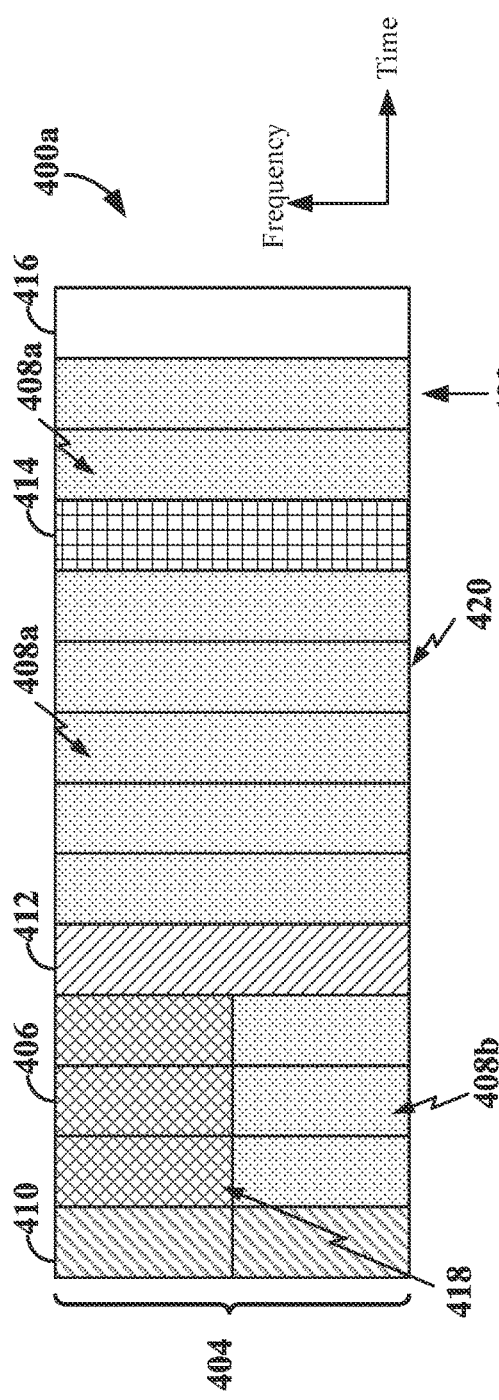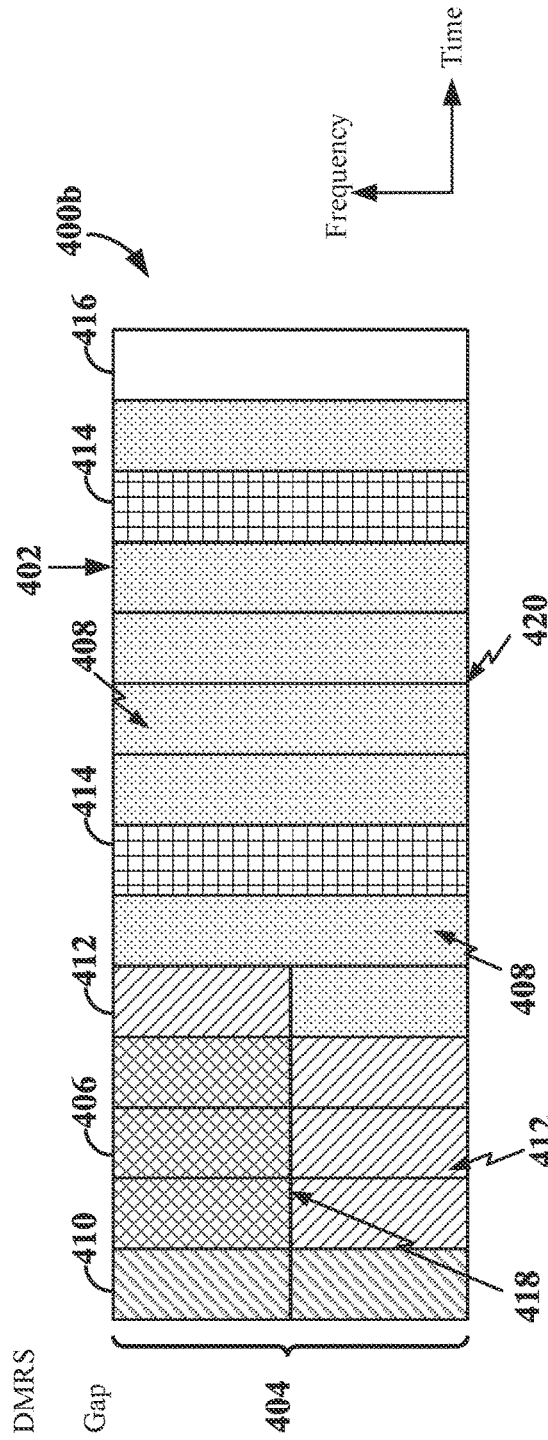

REPEATER DISCOVERY IN SIDELINK

TECHNICAL FIELD

The technology discussed below relates generally to wireless communication networks, and more particularly, to a repeater discovery in sidelink.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Sidelink communication may be autonomously scheduled (e.g., self-scheduled) by the UEs or may be scheduled by the base station. For example, the base station may transmit sidelink scheduling information to schedule sidelink communication between UEs via downlink control information. In some examples, a common carrier may be shared between the sidelink network and the cellular network, such that the resources on the common carrier may be allocated for both sidelink communication and cellular communication (e.g., uplink and downlink communication). For example, the base station may schedule sidelink traffic on uplink resources utilized for both uplink transmissions and sidelink transmissions or on downlink resources utilized for both downlink transmissions and sidelink transmissions.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a base station for wireless communication is disclosed. The base station may include a transceiver, a memory, and a processor communicatively coupled to the transceiver and the memory. In the example, the processor and the memory may be configured to transmit a message to a sidelink (SL)-repeater, configuring the SL-repeater to transmit sidelink synchronization signal blocks (S-SSBs) including a plurality of S-SSB index numbers, receive a SL-node identification and a preferred S-SSB index number of the plurality of S-SSB index numbers associated with the SL-repeater, and transmit the SL-node identification and the preferred S-SSB index number to the SL-repeater.

In another example, a method of wireless communication at a base station is disclosed. The method may include transmitting a message to a sidelink (SL)-repeater, configuring the SL-repeater to transmit sidelink synchronization signal blocks (S-SSBs) including a plurality of S-SSB index numbers, receiving a SL-node identification and a preferred S-SSB index number of the plurality of S-SSB index numbers associated with the SL-repeater, and transmitting the SL-node identification and the preferred S-SSB index number to the SL-repeater.

In another example, another base station for wireless communication is disclosed. The base station may include a transceiver, a memory, and a processor communicatively coupled to the transceiver and the memory. In this example, the processor and the memory may be configured to transmit a first message configuring a sidelink (SL)-repeater to broadcast a sidelink discovery message, receive a sidelink discovery report from the SL-repeater identifying one or more SL-nodes discovered by the SL-repeater, and transmit a second message activating the SL-repeater for sidelink communication with the one or more SL-nodes.

In another example, a sidelink (SL)-repeater for wireless communication is disclosed. The SL-repeater may include a transceiver, a memory, and a processor communicatively coupled to the transceiver and the memory. In this example, the processor and the memory may be configured to transmit a sidelink discovery message, receive one or more first responses from one or more respectively responding SL-nodes, in response to transmitting the sidelink discovery message, and transmit a report to a base station identifying a change in membership between a first list of the one or more respectively responding SL-nodes and a second list of previously responding SL-nodes.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations.

In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc. of varying sizes, shapes, and constitution.

Figure 1:
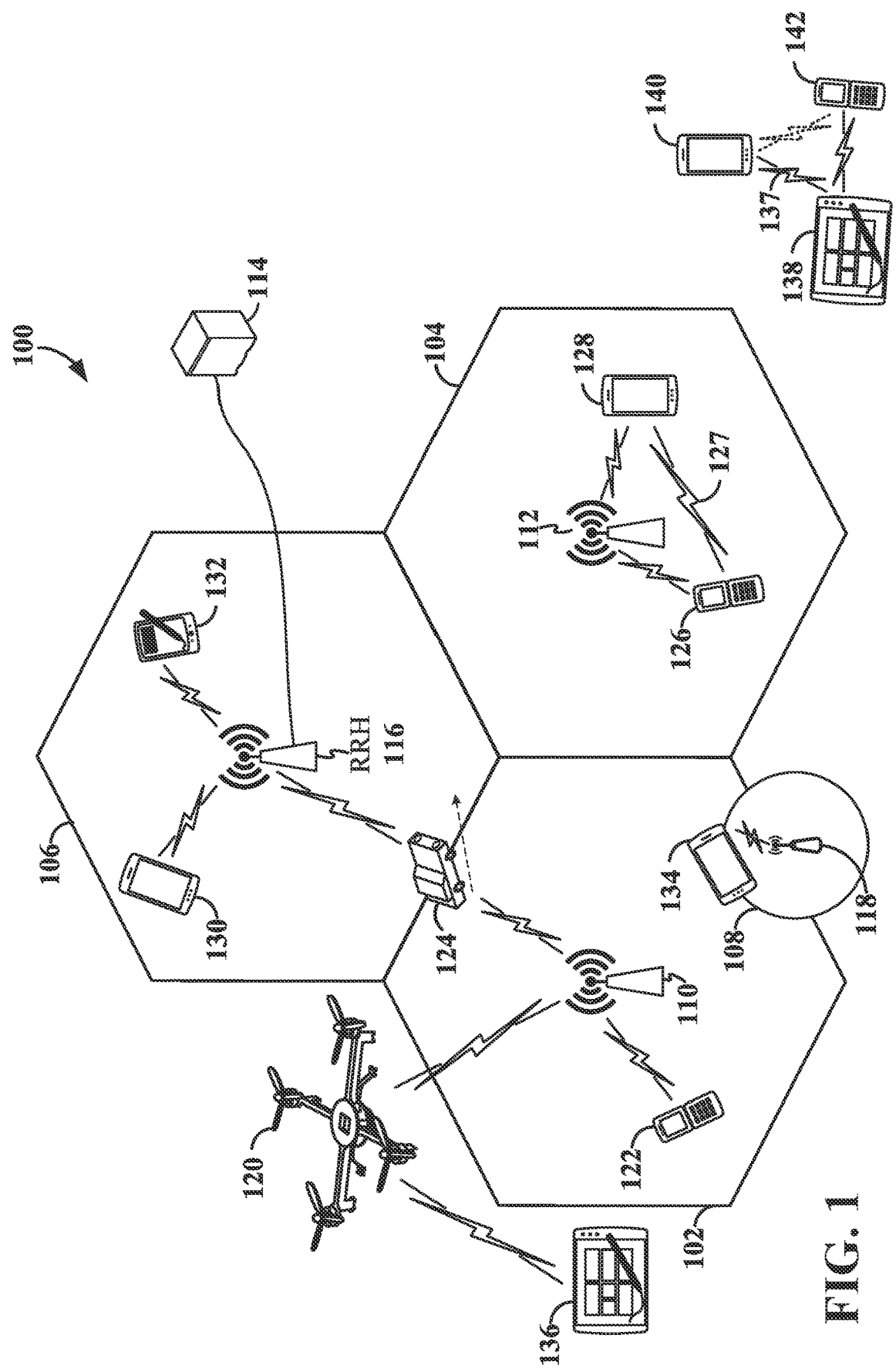
FIG. 1 is a diagram illustrating an example of a wireless radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the mobile cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly. e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
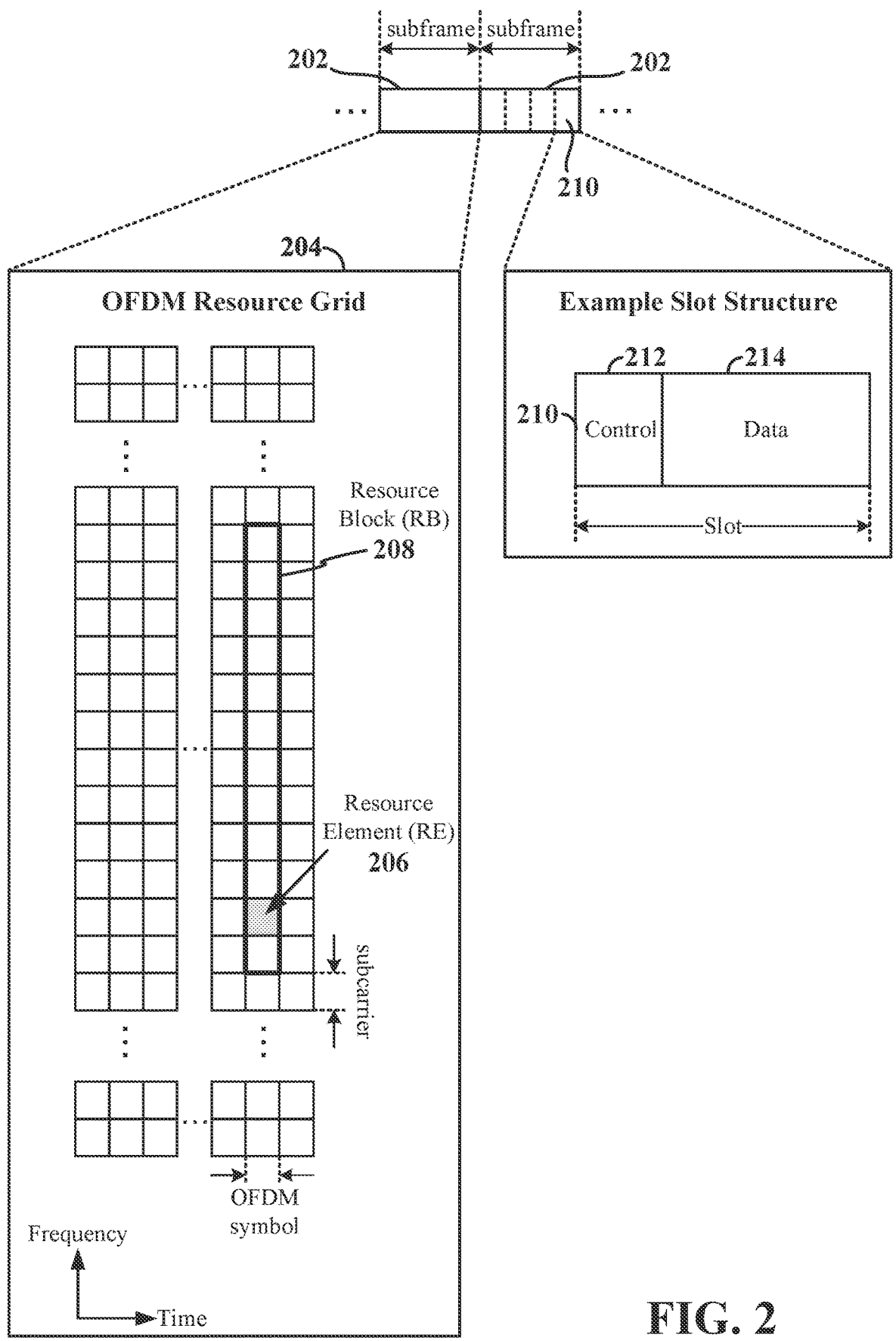
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESETO), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
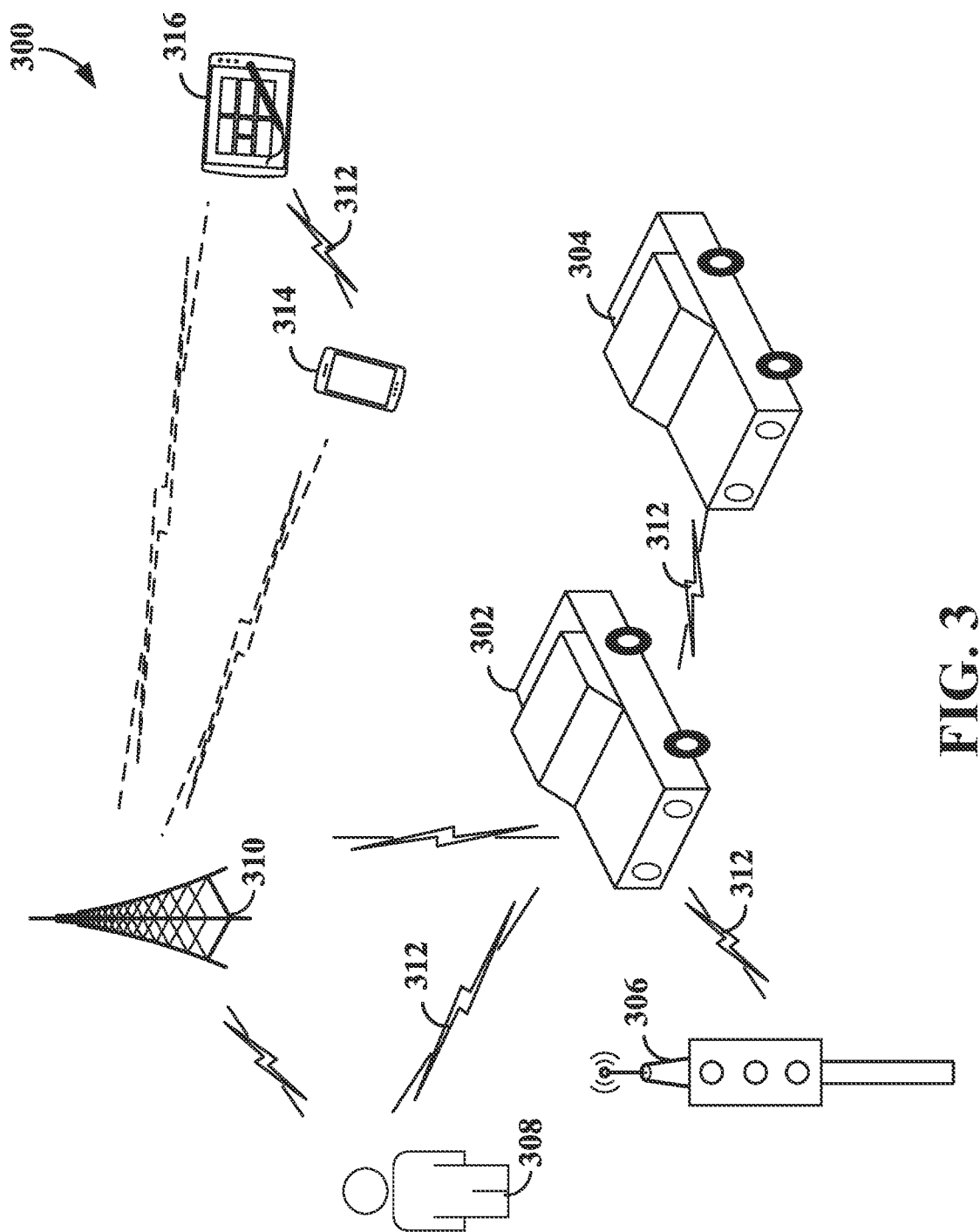
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition. V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either a road side unit (RSU) 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. DCI 3_0 may be transmitted by the base station 310 to allocate time and frequency resources and may indicate transmission timing. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device. In some examples, in Mode 1, the MCS is determined by the UE within a limit set by the base station.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of retransmission resources reserved for one or more retransmissions of the sidelink transmission (e.g., the sidelink traffic/data). Thus, the SCI may include a respective PSSCH resource reservation and assignment for one or more retransmissions of the PSSCH. For example, the SCI may include a reservation message indicating the PSSCH resource reservation for the initial sidelink transmission (initial PSSCH) and one or more additional PSSCH resource reservations for one or more retransmissions of the PSSCH.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM, where QPSK stands for quadrature phase shift keying and QAM stands for quadrature amplitude modulation). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400*a* or 400*b*. In addition, a gap symbol 416 is present after the PSSCH 408 in each slot 400*a* and 400*b*.

Each slot 400*a* and 400*b* further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400*a* and 400*b* is copied onto (repeated on) a first symbol 410 thereof for automatic gain control (AGC) settling. For example, in FIG. 4A, the second symbol containing the PSCCH 406 FDMed with the PSSCH 408*b* may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
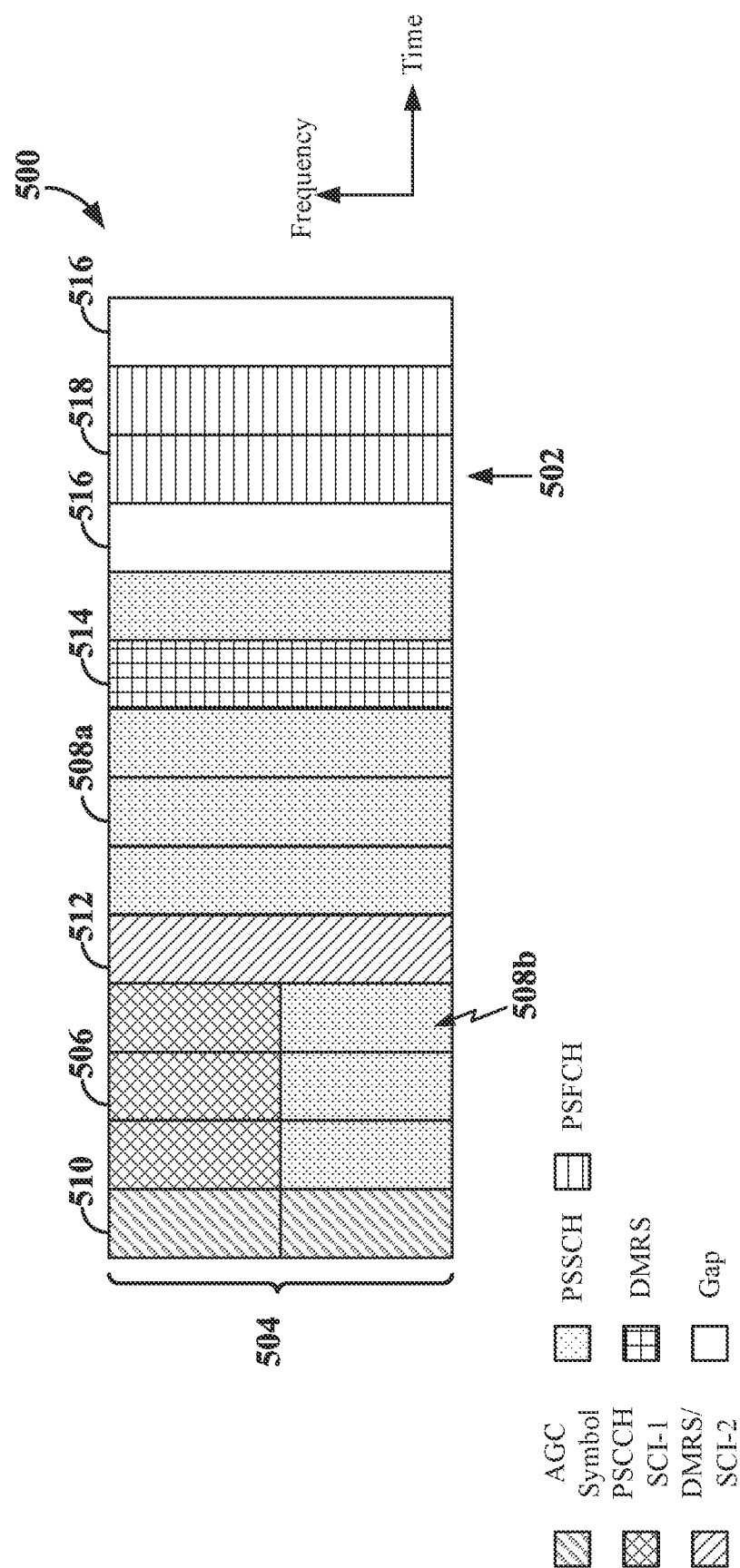
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region of the slot 500. The PSCCH 506 and PSSCH 508 are each transmitted on one or more symbols 502 of the slot 500. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508*a* that is TDMed with the PSCCH 506 and a second portion 508*b* that is FDMed with the PSCCH 506.

The PSSCH 508 may further include a DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508*b* may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH 518 symbols.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

Figure 6:
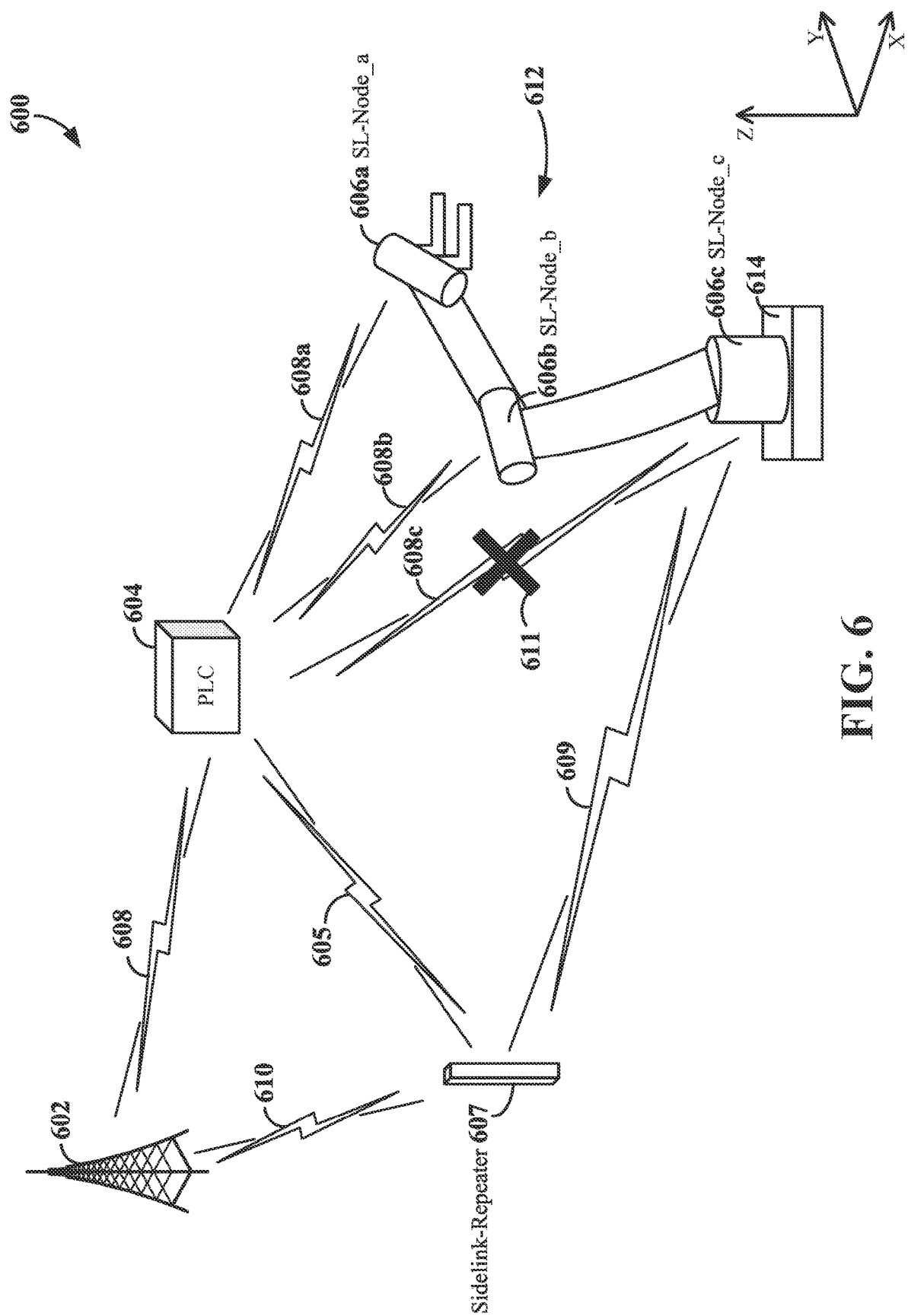
FIG. 6 is a schematic drawing of an example of a wireless communication network configured to support industrial internet of things according to some aspects.

FIG. 6 is a schematic drawing of an example of a wireless communication network 600 configured to support the industrial internet of things (IIoT) according to some aspects. The wireless communication network 600 may include a base station 602 (e.g., gNB) and a plurality of IIoT devices, such as a programmable logic controller (PLC) 604 and other IIoT devices, including but not limited to a sensor/actuators (SAs). In some examples, the PLC 604 may be configured to control between approximately twenty to fifty SAs. Also illustrated is a sidelink-repeater (SL-repeater 607) (also referred to herein as an assisting node).

Three SAs, referred to herein as a first SL-node 606*a*, second SL-node 606*b*, and a third SL-node 606*c*, are illustrated to avoid cluttering the drawing. The base station 602 and the PLC 604 may communicate via a first cellular (Uu) link 608. The base station 602 and the SL-repeater 607 may communicate via a second cellular (Uu) link 610. The PLC 604 and the SL-repeater 607 may communicate via a first sidelink (PC5) 605. The base station 602 and the SL-nodes 606a, 606b, 606c may communicate via respective cellular (Uu) links (not illustrated for simplicity); however, to reduce latency, the SL-nodes 606a, 606b, 606c may communicate with the PLC 604 via respective sidelink (PC5) 608a, 608b, 608c. Communication between the base station 602 and the SL-nodes 606a, 606b, 606c via cellular links would require multiple simultaneous or nearly simultaneous over-the-air (OTA) connections, adversely affecting latency and reliability. However, as shown in the example of FIG. 6, sidelink can enable direct communication between the PLC 604 and a plurality of SL-nodes (including but not limited to the SL-nodes 606a, 606b, 606c).

In FIG. 6, the SL-nodes 606a, 606b, 606c are depicted as motors that rotate the base and joints of a robotic arm 612; however, SL-nodes (including SAs) are not limited to these roles. Examples of SL-nodes include motors configured to provide rotational (roll, pitch, yaw) forces and/or translational (travel along the x, y, z-axis) forces, temperature sensors, stress and strain gauge sensors, fluid level sensors, environmental contamination warning sensors, switches, relays, etc. One skilled in the art would understand that SL-nodes, configured as sensors/actuators, may include various chemical, electrical, and mechanical devices used to manufacture and test substances and products.

Wireless communication between the PLC 604 and the SL-nodes 606a, 606b, 606c may be desirable in many environments, including but not limited to the IIoT environment. The benefits of using wireless nodes include flexibility in placement and the ability to be deployed quickly. Many wireless devices used in factory, warehouse, and other IIoT environments must meet stringent latency requirements (e.g., 1~2 ms) and ultra-reliability requirements (e.g., $10^{-6}$ error rate).

IIoT traffic may be periodic and deterministic and may utilize small packet sizes (e.g., 32-256 Bytes) compared to the packet sizes utilized in audio communication. Accordingly, the bandwidth utilized for IIoT traffic may be low (e.g., 2 RBs might be sufficient for some cases) compared to the bandwidth utilized in audio applications. While SL-nodes may be considered LUEs, SL-nodes in IIoT environments may be less sophisticated than, for example, a mobile phone. Although SL-nodes in IIoT environments may not need to detect and/or monitor all transmissions, they still may have stringent latency and block error ratio (BLER) requirements.

Furthermore, the environments (e.g., factories, warehouses) in which PLCs and SL-nodes are deployed may present challenging RF environments due, for example, to blockage and interference. For example, in some environments, IIoT may need to support ultra-reliable low latency communication (URLLC) traffic between the PLC 604 and the SL-nodes 606a, 606b, 606c. The end-to-end (ETE) latency target may be as small as 1 ms. The block error ratio (BLER), the ratio of the number of erroneous blocks received to the total number of blocks sent, may have a target of $1\times10^{-6}$. As stated above, PLCs and SL-nodes may be deployed using cellular (Uu) links, but such deployment may not be desirable. As described here, deployment without a base station (e.g., gNB) using mode 2 sidelink may be possible for IIoT environments. In some aspects, enhanced mode 2 for star topologies may be employed.

According to aspects described herein, a SL-repeater 607 may be used on an as-needed basis to provide a substitute link (e.g., a secondary path between the PLC 604 and the one or more SL-nodes 606a, 606b, 606c) when a direct link between the PLC 604 and any of the one or more SL-nodes is lost or suffers interference. In some examples, the SL-repeater 607 may be a SL-repeater 607 for IIoT. In some examples, the SL-repeater 607 may be, for example, a smart repeater or reflector. One example of a smart repeater or reflector may be a reconfigurable intelligent surface (RIS). The smart repeater (e.g., the SL-repeater 607) may be used to enhance the reliability of sidelink communications between PLCs (like PLC 604) and SL-nodes (e.g., SL-nodes 604a, 604b, 604c, 604d) by providing the secondary path between the PLC and one or more SL-nodes.

In the example of a SL-repeater 607 for IIoT operations in URLLC environments (but not limited thereto), the use of a SL-repeater 607 offers a cheaper and more robust solution compared to multiple transmit and receive point (mTRP) or NR (Uu) repeaters, for example. Furthermore, it is noted that a SL-repeater 607 deployment (e.g., deployment of SL-repeaters, such as SL-repeater 607) as described herein is distinguishable from mTRP deployment (e.g., for IIoT) in a number of ways, including but not limited to, the high cost of mTRP deployment (compared to the cost of SL-repeater deployment), the infeasibility of deploying mTRP due to the size of its terminals/radio heads in comparison the size of a SL-repeater, 607 the degree of difficulty or inability of mTRP to resolve blockage of a Uu path, the degree of difficulty or inability of mTRP to improve reliability to a level that is comparable to sidelink PLC-SA links, the degree of difficulty or inability to reduce latency (e.g., due to two-hop links) to a level that may be acceptable for the use of SL-nodes in URLLC scenarios, for example, and/or the overall difficulty or inability of a way to provide an alternative transmission path (e.g., RF link) if sidelink is entirely down. Similar distinguishing factors are present for NR smart repeaters for Uu links.

According to some examples, SL-nodes may be deployed at low elevations relative to the floors of the environments (e.g., warehouses, factories, recycling centers, etc.) in which they are used. For example, in FIG. 6, SL-node_c 606c may be an SL-node located just above the base 614 of the robotic arm 612. The base 614 is mounted to the floor (not shown) of a warehouse, factory, recycling center, etc. Moving machinery, pallets piled high with products, mobile robots, and any manner of low and dense clutter may be rolled or otherwise moved on the floor between the PLC 604 and SL-node_c 606c. The possibility of a low and dense clutter moving between the PLC 604 and SL-node_c 606c makes a PLC/SL-node_c blockage probability higher than that of both of the PLC/SL-node_a and the PLC/SL-node b blockage probabilities because SL-node_b 606b and SL-node_a 606a are both mounted at higher elevations relative to the base 614 of the robotic arm 612. For example, the respective sidelink (PC5) between the PLC 604 and SL-node_a 606a, SL-node_b 606b, respectively, may be blocked in examples in which there is a large amount of and/or dense amount of clutter. Of course, the example of FIG. 6 is overly simplified and not a limitation.

In the example shown in FIG. 6, the sidelink (PC5) between the PLC 604 and the SL-node_c 606c is lost (as represented by the "X" 611 superimposed on the wireless link symbol). The loss may be due to an object blocking the path between the PLC 604 and the SL-node 606c, or due to interference, or any other cause. According to aspects herein, a smart SL-repeater or reflector (represented by the SL-repeater 607) may be used to enhance the reliability of the sidelink communication between the PLC 604 and the SL-node_c 606c by providing a secondary path between the PLC 604 and the SL-node_c 606c. In the example, the secondary path is represented by the first sidelink (PC5) 605 between the PLC 604 and the SL-repeater 607. The second sidelink (PC5) 609 between the SL-repeater 607 and the SL-node_c 606*c* may enhance the reliability of SL communications between PLCs and SL-nodes by providing a secondary path between the SL-nodes.

In the examples described herein, the SL-repeater 607 and the SL-nodes 606*a*. 606*b*, 606*c* may discover each other, and the SL-repeater 607 may be associated with one or more SL-nodes/links to improve the sidelink reliability. A direct sidelink (e.g., between SL-repeater 607 and each of the SL-nodes 606*a*, 606*b*, 606*c*) may ensure low latency. In some examples, the repeating operations (also referred to as sidelink repeating operations) may be enabled or disabled by the base station 602, the PLC 604, or both. The sidelink repeating operation may be controlled by the base station 602 and/or the PLC 604 to control interference and link loss management. Various aspects relate to the discovery of the SL-repeater 607 and the SL-nodes 606*a*. 606*b*, 606*c*, as well as reporting to a control entity.

Figure 7:
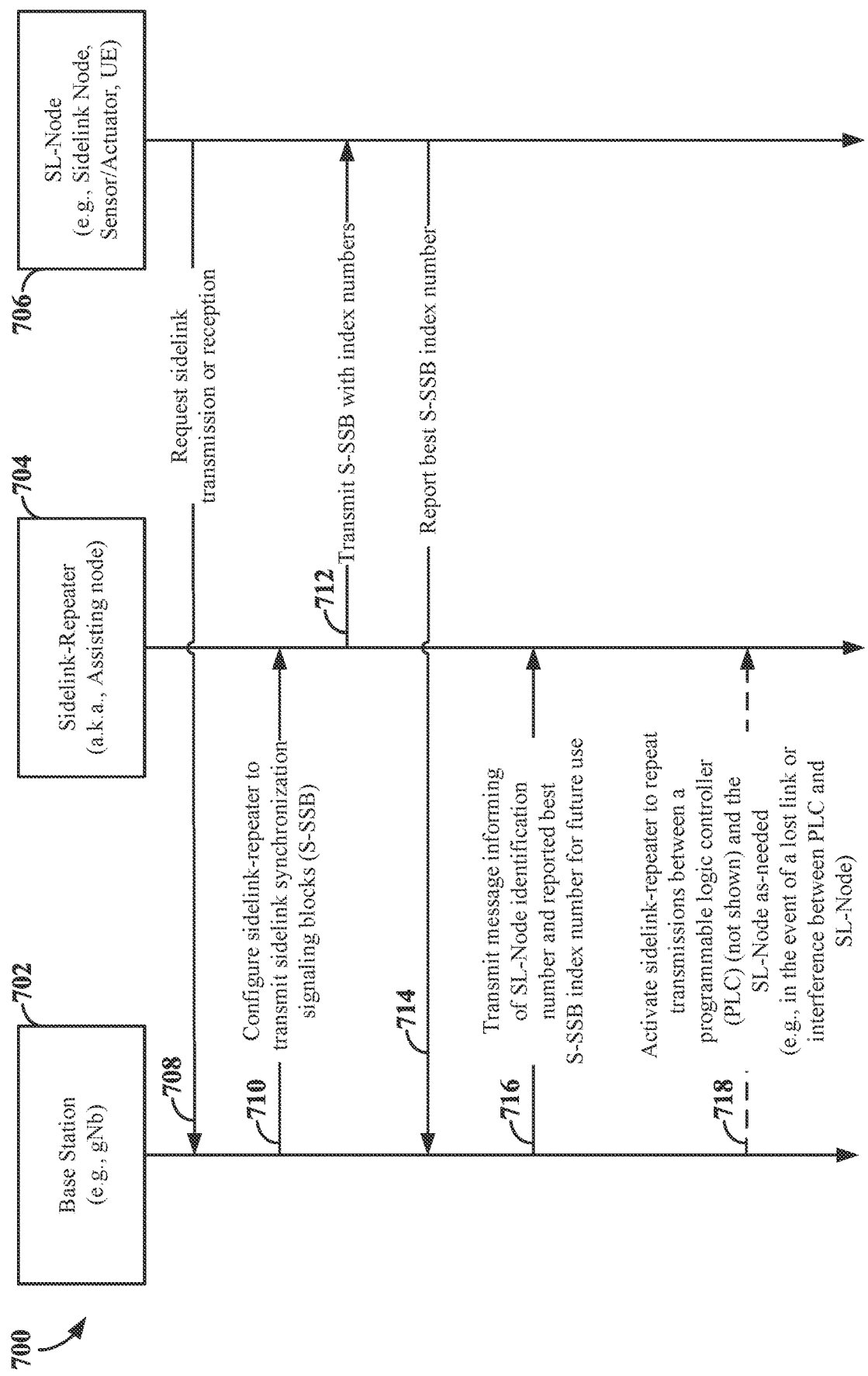
FIG. 7 is a signaling diagram illustrating exemplary signaling between a base station, a sidelink-repeater, and a sensor/actuator according to some aspects.

FIG. 7 is a signaling diagram 700 illustrating exemplary signaling between a base station 702 (e.g., a gNB), a SL-repeater 704 (e.g., an assisting node), and a sensor/actuator (SA) 706 (e.g., a sidelink node, a UE) according to some aspects. FIG. 7 depicts one implementation of sidelink synchronization signal block (S-SSB)-based SL-repeater discovery according to some aspects. The base station 702 may correspond to any of the base stations or other scheduling entities illustrated in FIGS. 1 and/or 3, and more particularly, the base station 702 may correspond to the base station 602 as shown and described in connection with FIG. 6. The SL-repeater 704 may correspond to the SL-repeater 607 as shown and described in connection with FIG. 6. The SL-node 706 may correspond to any of the UEs or scheduled entities illustrated in FIGS. 1 and/or 3, and more particularly, for example, due to some reduced capability and/or specific requirements for URLLC in an IIoT environment, may correspond to any of SL-node_a 606*a*, SL-node_b 606*b*, and/or SL-node_c 606*c* as shown and described in connection with FIG. 6.

At 708, the SL-node 706 may request sidelink transmission or reception via control signaling to the base station 702 over a cellular (Uu) link. The base station 702 may know that the SL-repeater 704 has sidelink capability. At 710, the base station may configure the SL-repeater 704 to transmit a sidelink synchronization signal block (S-SSB). The S-SSB may be transmitted in a preset directional pattern, where transmissions in each direction are differentiated by index number. At 712, the SL-repeater 704 may transmit the S-SSB with index numbers. The SL-node 706 may receive one or more of the S-SSB indexed transmissions and identify the S-SSB index number associated with the highest reference signal received power (RSRP). At 714, the SL-node 706 may transmit a report to the base station 702 identifying the S-SSB index number with the highest RSRP. In some examples, the SL-node 706 may also include a measurement report. The measurement report may indicate the RSRPs for each of a plurality of S-SSB index values.

According to the process described above, sidelink discovery between the SL-repeater 704 and the SL-node 706 may be inferred at the base station 702 and transparent to the SL-repeater 704 and the SL-node 706. In other words, the SL-repeater 704 and the SL-node 706 may be transparent to the discovery despite their contribution to the discovery procedure because the reporting and SSB-transmission configuration may be known to the base station 702 (e.g., the gNB) but may not be known to the SL-repeater 704 and the SL-node 706. For example, although the SL-node 706 may report the best SSB index number to the base station 702, the SL-node 706 may not know that the SSB is transmitted via the SL-repeater 704. Similarly, the SL-repeater 704 may transmit the SSB; however, the SL-repeater 704 may not know that the SL-node 706 is best served by the SSB transmitted by the SL-repeater 704 because the SL-node 706 may report the best SSB index number to the base station 702 (but not to the SL-repeater 704). At 716, the base station 702 may transmit a message to the SL-repeater 704, informing the SL-repeater 704 of an identification number of the SL-node 706 and the reported best S-SSB index number for possible future use. The message may be explicit or implicit. In one example, an explicit message may be one in which the base station 702 explicitly informs the SL-node 706 and the SL-repeater 704 that they are near each other (e.g., in physical proximity, within a certain measured distance between each other, in a given area of a warehouse, in a given zone of a factory floor). In one example, an implicit message may be a message in which the base station 702 informs the SL-node 706 that certain SSB indexes (e.g., SSB index numbers) are transmitted by a given SL-repeater (such as SL-repeater 704). If the SL-node 706 is best served by one of the certain SSB indexes, then the SL-node 706 may infer that the SL-node 706 is near the given SL-repeater (such as SL-repeater 704).

The base station 702 may additionally or alternatively inform the SL-node 706 of an identifier of the SL-repeater 704 (and the best S-SSB identified by the SL-node 706). The SL-node 706 may obtain the capability of the SL-repeater 704 if the sidelink capability of SL-repeater 704 is not part of the SSB configurations. The SL-repeater 704 may record the identification number of the SL-node 706, and the associated reported best S-SSB index number for later sidelink repeating operations. The identification number and reported best S-SSB index may allow the SL-repeater 704 to directionally transmit/receive to/from the SL-node 706 via a sidelink (PC5) (e.g., similar to the second sidelink (PC5) 609 as shown and described in connection with FIG. 6). Likewise, the SL-node 706 may use the identification of the SL-repeater 704, and the associated reported best S-SSB index number to directionally transmit/receive to/from the SL-repeater 704 via a sidelink (PC5) on the as-needed basis. In some examples, the need may arise if, for example, a sidelink (PC5) between the SL-node 706 and a PLC (not shown) is lost (e.g., broken) or experiences interference at a level that makes demodulation and/or decoding impractical or impossible. At 718, the base station 702 may activate the SL-repeater 704 to repeat transmissions between the PLC (not shown, but similar to PLC 604 as shown and described in connection with FIG. 6) and the SL-node 706 on the as-needed basis.

Figure 8:
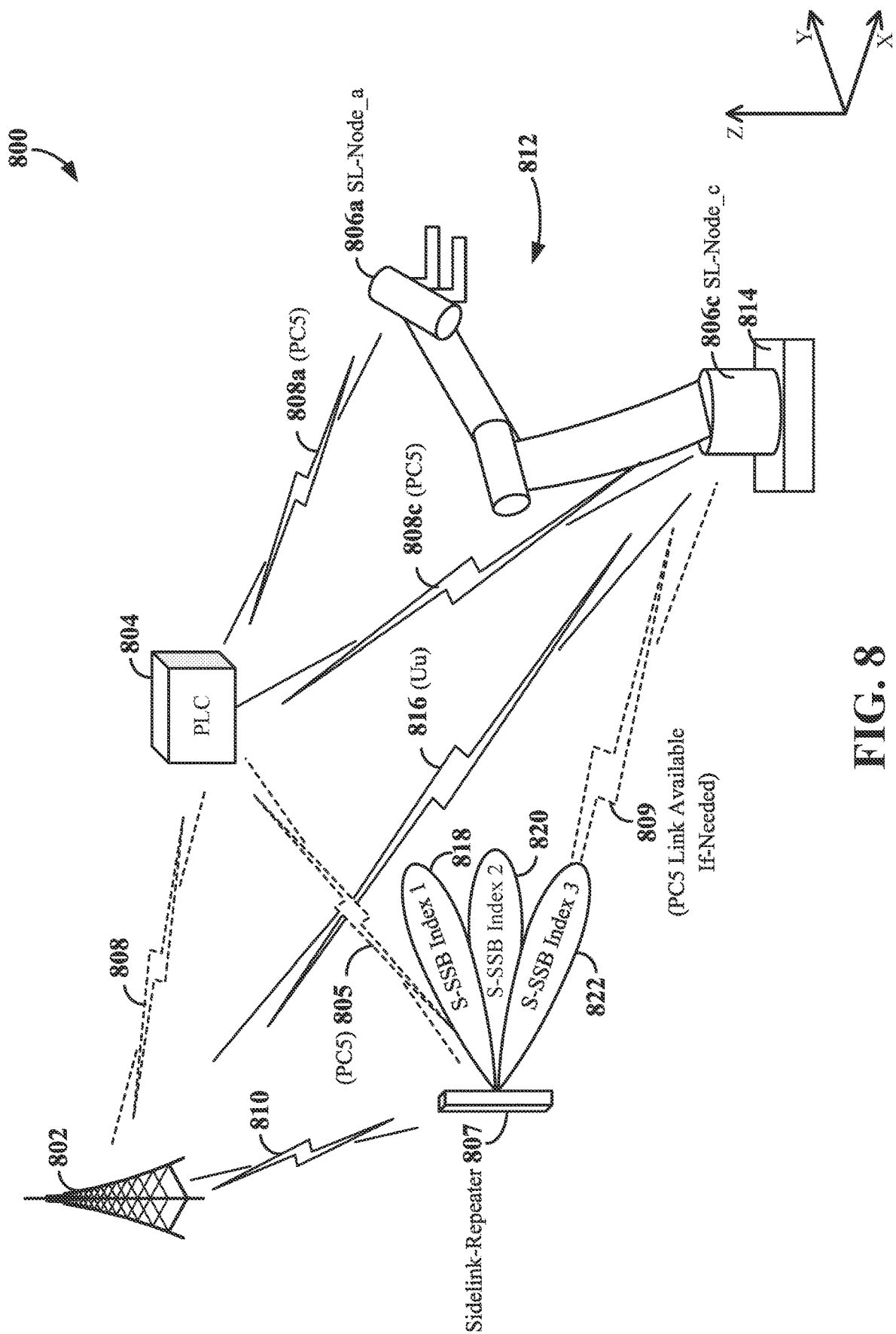
FIG. 8 is a schematic illustration of the environment in which the signaling of FIG. 7 may occur according to some aspects.

FIG. 8 is a schematic illustration of the environment 800 in which the signaling of FIG. 7 may occur, according to some aspects. In the example of FIG. 8, a first sidelink (PC5) 808*a* may be maintained between the SL-node_a 806*a* (similar to SL-node_a, 606*a* of FIG. 6) and the PLC 804 (similar to PLC 604 of FIG. 6). A second sidelink (PC5) 808*c* may be maintained between the SL-node_c 806*c* (similar to SL-node_c, 606*c* of FIG. 6) and the PLC 804. A first cellular (Uu) link 816 may be established between the SL-node_c 806*c* and the base station 802 (similar to base station 602 of FIG. 6). The first cellular (Uu) link between the PLC 804 and the base station 802 is provided for reference; the first cellular (Uu) link is not involved in the process described by the signaling diagram 700 of FIG. 7. A second cellular (Uu) link 810 is depicted between the base station 802 and the SL-repeater 807.

Similar to the description provided above in connection with FIG. 6, the SL-node_c 806c may request sidelink transmission or reception via control signaling to the base station 702 over the second cellular (Uu) link 816. In response, the base station 802 may configure the SL-repeater 807 to transmit a sidelink synchronization signal block (S-SSB). The S-SSB may be transmitted in a preset directional pattern, where transmissions in each direction are differentiated by index number. For example, S-SSB index number one 818 may be directed between the PLC 804 and the SL-node_a 806a. S-SSB index number two 820 may be directed toward SL-node_a 806a. S-SSB index number three 822 may be directed toward SL-node_c 806c. At SL-node_c 806c, the strongest RSRP may be measured for the S-SSB index number three 822.

The SL-node_c 806c may transmit a report to the base station 802 identifying the S-SSB index number three 822 as having the highest RSRP. The base station 802 may transmit a message to the SL-repeater 807 via the third cellular (Uu) link 810, informing the SL-repeater 807 of an identification number of SL-node_c 806c, and reporting that the best S-SSB index number for possible future use is S-SSB index number three 822.

The base station 802 may activate the SL-repeater 807 to repeat transmissions between the PLC 804 (similar to PLC 604 as shown and described in connection with FIG. 6) and SL-node_c 806c on the as-needed basis. The need may arise if the second sidelink (PC5) 808c, between the PLC 804 and the SL-node_c 806c is lost or receives excessive interference. In that event, the third sidelink (PC5) 805 between the PLC 804 and the SL-repeater 807, and the fourth sidelink (PC5) 809 between the SL-repeater 807 and the SL-node_c 806c may be activated, thus providing a second (e.g., unobstructed) path for URLLC communications between the PLC 804 and the SL-node_c 806c via the SL-repeater 807.

Figure 9:
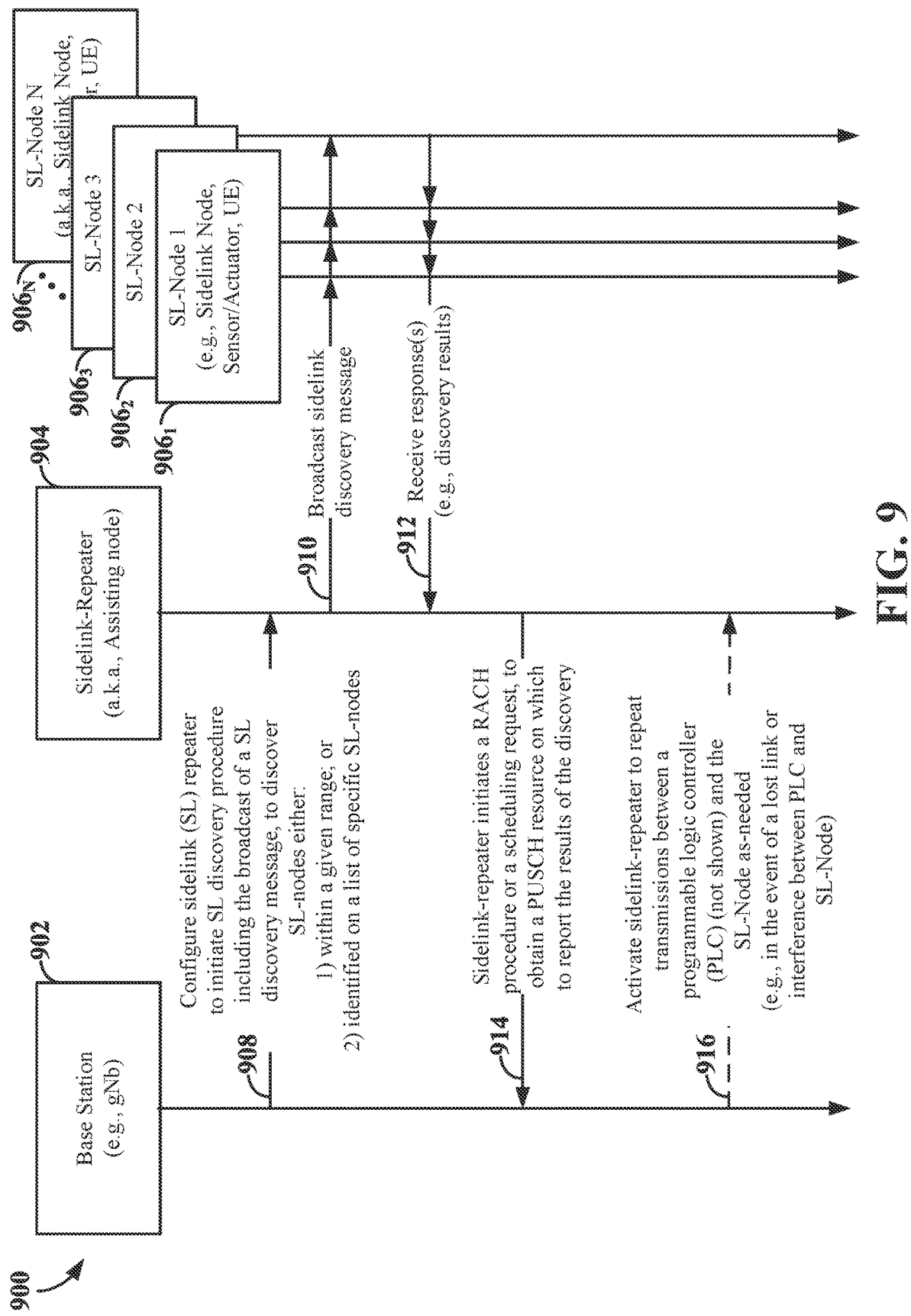
FIG. 9 is a signaling diagram illustrating exemplary signaling between a base station, a sidelink-repeater, and plurality of sidelink nodes, according to some aspects.

FIG. 9 is a signaling diagram illustrating exemplary signaling 900 between a base station 902 (e.g., a gNB), a SL-repeater 904 (e.g., an assisting node), and a plurality of SL-nodes $906_1$, $906_2$, $906_3$, ... $906_N$ (where N is a positive integer) (e.g., sidelink nodes, UEs) according to some aspects. FIG. 9 depicts network-assisted sidelink discovery implemented by an SL-repeater, SL-repeater 904 according to some aspects. The base station 902 may correspond to any of the base stations or other scheduling entities illustrated in FIGS. 1 and/or 3, and more particularly, the base station 902 may correspond to the base station 602 as shown and described in connection with FIG. 6. The SL-repeater 904 may correspond to the SL-repeater 607 as shown and described in connection with FIG. 6. The plurality of SL-nodes $906_1$, $906_2$, $906_3$, ..., $906_N$ may correspond to any UEs or scheduled entities illustrated in any of FIGS. 1 and/or 3.

The base station 902 may identify the repeating capability of the SL-repeater 904 and may receive sidelink transmission/reception request(s)(not shown) from one or more of the plurality of SL-nodes $906_1$, $906_2$, $906_3$, ..., $906_N$. At 908, the base station 902 may configure the SL-repeater 904 to initiate a discovery procedure to discover sensors/actuators (SAs) either: within a given range; or identified on a list of specific SL-nodes.

For example, in connection with initiating the discovery procedure to discover SL-nodes within a given range at 908 part 1, the base station 902 may configure the SL-repeater 904 to initiate the sidelink discovery procedure to identify SL-nodes in the proximity of the SL-repeater 904 and to report the sidelink identifiers (SL-IDs) of the SL-nodes back to the base station. The base station 902 may trigger the procedure based, for example, on a reported SSB index, i.e., the SL-repeater 904 and one or more of the plurality of SL-nodes $906_1$, $906_2$, $906_3$, ..., $906_N$, may use the SL-node (or similar) beam for receiving SSB transmitted by base station 902. The base station 902 may trigger the discovery procedure in an aperiodic, semi-persistent, or periodic manner. The base station 902 may provide PUSCH resources that may be used to report the discovered SL-nodes.

According to one aspect, at 908, the SL-repeater 904 may be configured to broadcast a sidelink discovery message. At 910, the SL-repeater 904 broadcasts the sidelink discovery message. The SL-repeater 904 may broadcast the sidelink discovery message to discover all neighboring SL-nodes. According to some aspects, the broadcast message may be a physical beacon signal or upper-layer message. In some examples, the base station may configure the transmit power of the discovery message broadcast from the SL-repeater 904. In some examples, the base station may configure a targeted range around the SL-repeater 904 to discover SL-nodes.

The discovery message may be simply an announcement of the presence of the SL-repeater 904 (e.g., the SL-repeater 904 may broadcast its identifier/identification (ID)). Furthermore, other sidelink nodes may discover (not shown) the SL-repeater 904 and report back (not shown) to the base station 902. The ID of the SL-repeater 904 may be assigned by or known to the base station 902.

According to another aspect, where the SL-repeater 904 may still be configured to broadcast a SL discovery message at 902, the discovery message may indicate communication range information and/or a reference signal (RS) measurement threshold to define the range. For example, only SL-nodes measuring a DMRS above the measurement threshold may respond to the sidelink discovery message. As known to those of skill in the art, the further an SL-node (e.g., one or more of SL-nodes $906_1$, $906_2$, $906_3$, ..., $906_N$) is from the SL-repeater 904, the weaker the DMRS becomes. Thus, as the range between an SL-node and the SL-repeater 904 shrinks, the measure of the DMRS increase. At a specific range, the measured DMRS may exceed the measurement threshold. In response to reaching this specific range, and as the SL-node moves closer to the SL-repeater 904, the SA 906 may begin to respond to the sidelink discovery message being broadcast from the SL-repeater 904. According to some aspects, the measurement threshold may be configured by the base station 902 (e.g., configured by a gNB) or may be configured by the SL-repeater 904. In one example, the measurement threshold may be based on the power class (PC) of the SL-repeater 904. Of course, the measurement threshold may be based on other things; PC is provided as an example and not a limitation.

At 912, if the conditions for responding to the discovery message are met (e.g., DMRS meets or exceeds the power threshold), the SL-nodes $906_1$, $906_2$, $906_3$, through $906_N$, or any one or more of them, may report directly back to the SL-repeater 904 (as shown), or to the base station 902 (not shown).

The discovery message broadcast from the SL-repeater 904 may further indicate that the entity broadcasting the message is a SL-repeater 904. SL-nodes may prioritize/deprioritize their responses, for example, depending on their traffic profile and requirements.

The SL-repeater 904 and SL-nodes may report the discovered SL-nodes, with or without measured RSRP of RS, to the base station using a scheduled PUSCH resource provided by the base station.

According to another aspect of network-assisted discovery, the SL-repeater 904 may be configured to discover specific SL-node(s). For example, the base station 902 may provide a list of SL-nodes (e.g., IDs of the SL-nodes) to the SL-repeater 904, the list may be based, for example, on an SL-node (e.g., a UE) reporting a request of sidelink transmission/reception resources and identification of SSB index, similar to the one used and described above by the SL-repeater 904.

In some aspects, the SL-repeater 904 may initiate a sidelink transmission to discover the specific SL-nodes identified in the list provided by the base station 902. For example, the SL-repeater 904 may include an SL-node ID (e.g., a SL-ID, a UE-ID) in an SCI-2 of a sidelink transmission.

At 914, the SL-repeater 904 (or SL-nodes) may initiate a RACH procedure or scheduling request (SR) to obtain a PUSCH resource to report the discovery results. If discovered SL-nodes satisfy certain criteria, e.g., the number of SL-nodes exceeds a threshold, the RSRP of the DMRS measured at the SL-node is greater than a predefined power threshold, the SL-node is on a list of specific SL-nodes provided to the SL-repeater 904 by the base station 902, or a discovered SL-node is requesting the SL-repeater 904 to perform sidelink repeating, etc., the result of the discovery request would be reported to the base station 902. In some aspects, the SL-repeater 904 may initiate a RACH process or transmit a SR to report the discovery results. For example, if the number of discovered SL-nodes (e.g., discovered nodes) in the list exceeds a threshold. In some examples, the threshold number may be configured by the base station 902.

In some aspects, the SL-repeater 904 may be allocated the PUSCH resource on which to report discovered, and not discovered. SL-nodes along with an RS measurement report (e.g., RSRP of DMRS).

Alternatively, base station 902 may provide the SL-repeater 904 with a list of sidelink (SL) pairs (SL-Tx and SL-Rx) for discovery. In one example, the SL-repeater 904 may only report the results of the sidelink discovery in response to the SL-repeater 904 discovering at least one or more pairs of sidelinks.

According to some aspects, the SL-repeater 904 may be provided a few recommended beam indexes that may be used to direct its antenna array toward the one or more discovered SL-nodes. The beam index information between the SL-repeater 904 and a given SL-node may be inferred at the base station (for example, in the way described above).

Similarly, other in-coverage SL-nodes (not shown) may be configured by the base station 902 to initiate the sidelink discovery procedure for SL-repeater 904 discovery and report the discovery results to the base station 902.

At 916, the base station 902 may activate the SL-repeater 904 to repeat transmissions between the PLC (not shown, but similar to PLC 604 as shown and described in connection with FIG. 6) and any given SL-node (for example, SL-node1 906₁) having, for example, a broken link with the PLC, or an amount of interference on the link with the PLC that cannot be compensated for by other circuitry. In that event, a sidelink (PC5) between the PLC and the SL-repeater 904, and between the SL-repeater 904 and the given SL-node (for example, SL-node1 906₁) having the broken link or excessive interference, is established (providing a second path for URLLC communications between the PLC and the given SL-node via the SL-repeater 904).

Figure 10:
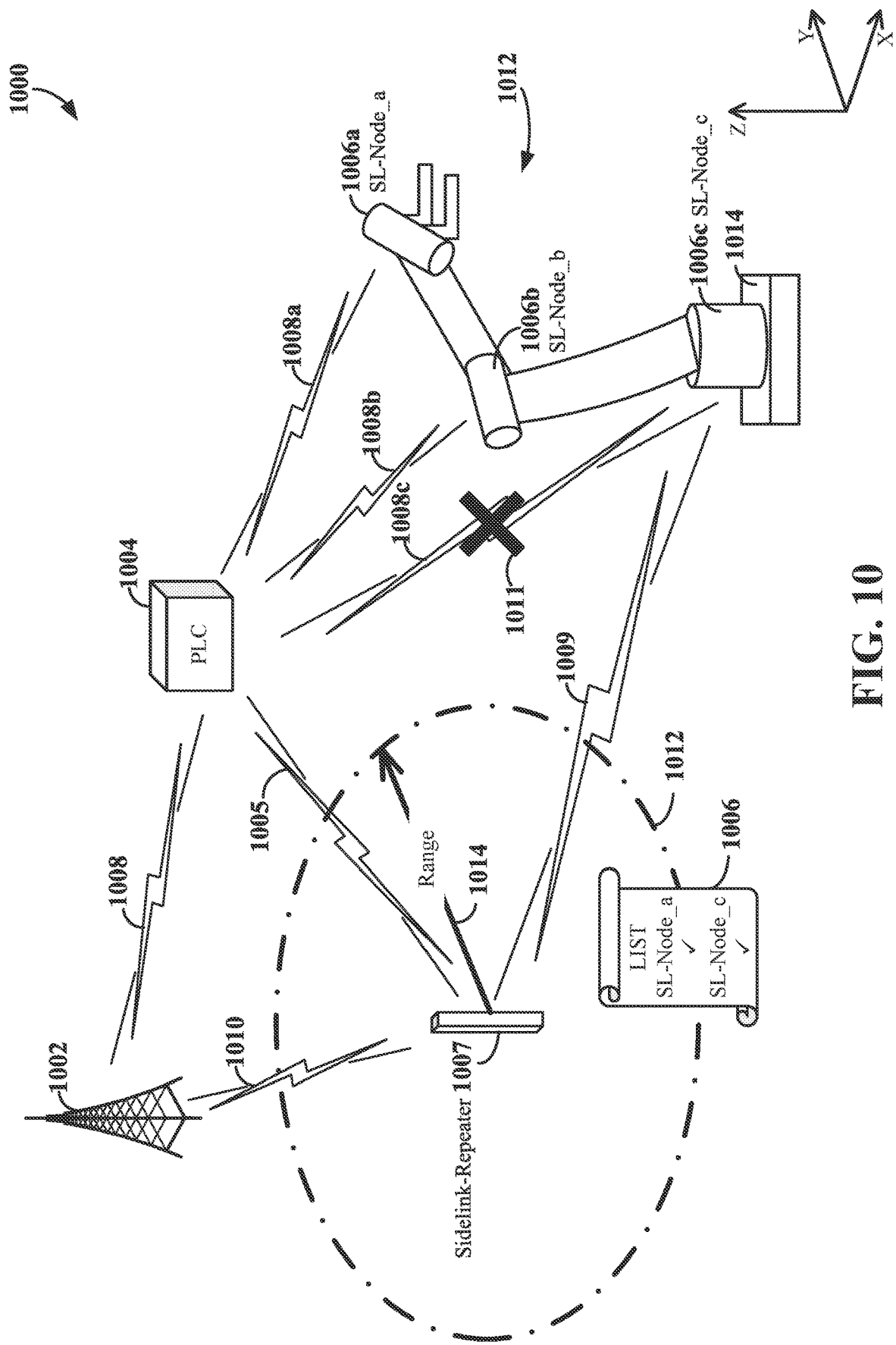
FIG. 10 is a schematic drawing of an example of a wireless communication network configured to support industrial internet of things according to some aspects.

FIG. 10 is a schematic drawing of an example of a wireless communication network configured to support industrial internet of things according to some aspects. Reference numbers in FIG. 10 correspond to similar reference numbers in FIG. 6; accordingly, their descriptions will not be repeated for the sake of brevity. For example, base station 602 corresponds to base station 1002; PLC 604 corresponds to PLC 1004, etc. FIG. 10 depicts, for purposes of illustration and discussion, a range circle 1012 centered on the SL-repeater 1007. One measure of range is given by the vector 1014. The radius of the range circle 1012 (also illustrated as the vector 1014) may be determined by any of the methods described above, for example, and without limitation. In one example, the radius of the range circle 1012 may be defined by a power threshold, where SL-nodes (e.g., UEs) within the range circle 1012 have an RSRP of a DMRS that exhibits a level greater than a power threshold. Other ways to define or describe the range circle 1012 are within the scope of the disclosure. For example, FIG. 10 depicts a List 1006 that, in some examples, may have been provided to the SL-repeater 1007 by the base station 1002. In examples in which the SL-repeater 1007 is to initiate a discovery procedure to discover the SL-nodes identified on a list, the List 1006 shown in FIG. 10 provides an example in which SL-node_a 1006a and SL-node_c 1006c are on the List 1006, but SL-node_b 1006b is not on the List 1006. Accordingly, in this example, the SL-repeater 1007 would initiate the discovery procedure to identify SL-node_a 1006a and SL-node_c 1006c but would not attempt to identify SL-node_b 1006b (because SL-node_b 1006b is not on the List 1006 of specific SL-nodes provided to the SL-repeater 1007 by the base station 602).

Figure 11:
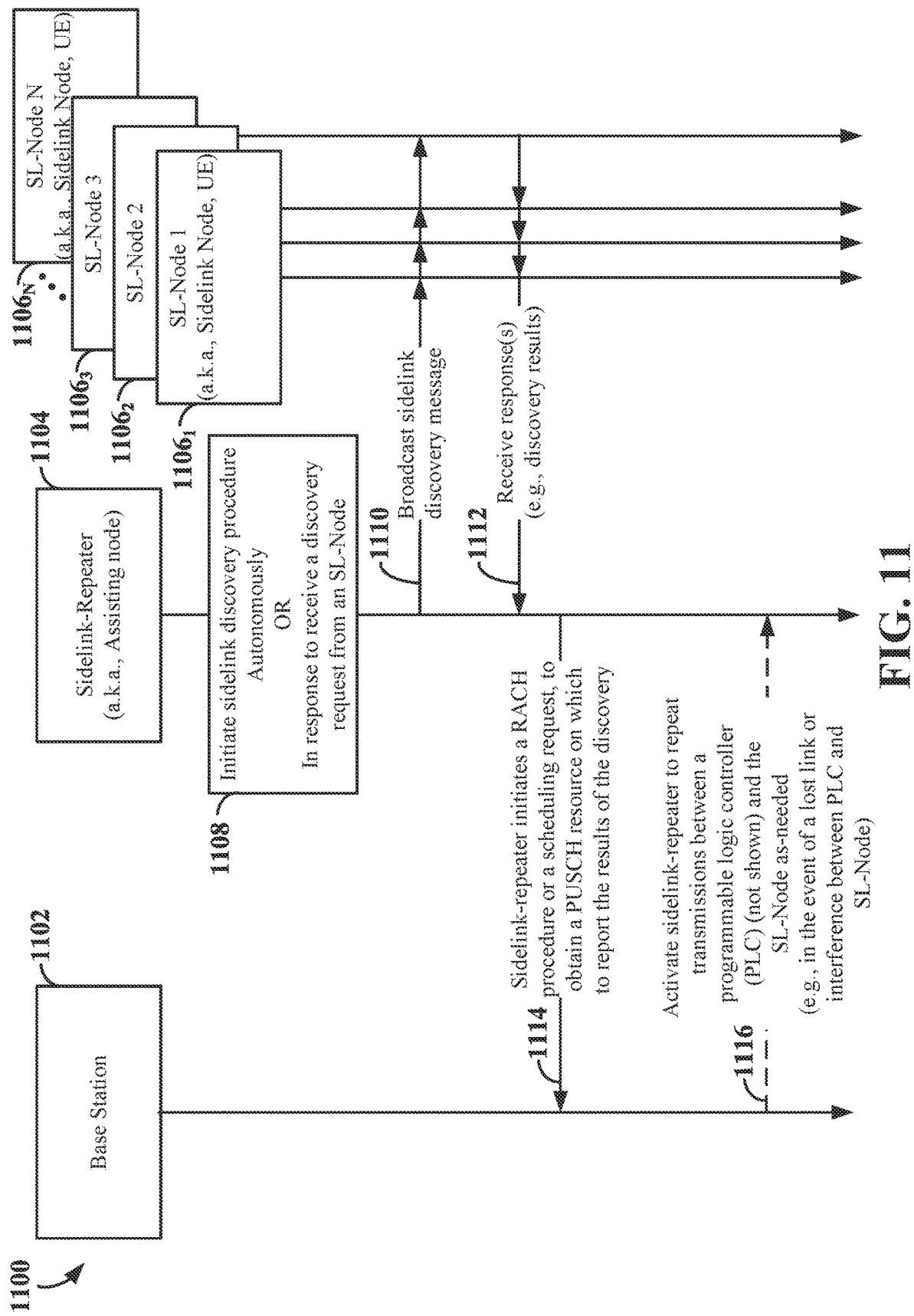
FIG. 11 is a signaling diagram illustrating exemplary signaling between a base station, a SL-repeater, and plurality of SL-nodes according to some aspects.

FIG. 11 is a signaling diagram illustrating exemplary signaling 1100 between a base station 1102 (e.g., a gNB), a SL-repeater 1104 (e.g., an assisting node), and plurality of SL-nodes 906₁, 906₂, 906₃, . . . , 906_N (where N is a positive integer) (e.g., sidelink nodes, UEs) according to some aspects. FIG. 11 depicts autonomous sidelink discovery implemented by a SL-repeater. SL-repeater 1104 according to some aspects. The base station 1102 may correspond to any of the base stations or other scheduling entities illustrated in FIGS. 1 and/or 3, and more particularly, the base station 1102 may correspond to the base station 602 as shown and described in connection with FIG. 6. The SL-repeater 1104 may correspond to the SL-repeater 607 as shown and described in connection with FIG. 6. The plurality of SL-nodes 906₁, 906₂, 906₃, . . . , 906_N may correspond to any UEs or scheduled entities illustrated in any FIGS. 1 and/or 3, and more particularly, for example due to some reduced capability and/or specific requirements for URLLC in an IIoT environment, may correspond to any of SL-node_a 606a, SL-node_b 606b, and/or SL-node_c 606c as shown and described in connection with FIG. 6.

At 1108, the SL-repeater 1104 may autonomously initiate a sidelink discovery procedure; alternatively, the SL-repeater 1104 may initiate the sidelink discovery procedure in response to receiving a discovery request from an SL-node (such as, for example, SL-node₁ 1106₁).

At 1110, the SL-repeater 1104 broadcasts the sidelink discovery message.

At 1112, if the conditions for responding to the discovery message are met (e.g., DMRS meets or exceeds the power threshold), the SL-nodes 1106₁, 1106₂, 1106₃, through 1106_N (where N is a positive integer), or any one or more of them, may report directly back to the SL-repeater 1104 (as shown), or to the base station 1102 (not shown).

At 1114, the SL-repeater 1104 (or SL-nodes) may initiate a RACH procedure or scheduling request (SR) to obtain a PUSCH resource to report the discovery results. According to one example, the SL-repeater 1104 may report to the base station 1102 via RACH/SR upon any changes of discovered nodes in one or more of the following cases:
1) an associated SL-node (e.g., a previously discovered SL-node) cannot be discovered;
2) new SL-nodes are discovered in a quantity exceeding a first predetermined threshold;
3) previously discovered SL-nodes cannot be discovered in a quantity exceeding a second predetermined threshold; and/or
4) a new SL-node having traffic priority exceeding a third predetermined threshold is requesting sidelink repeating via the SL-repeater 1104.

In some examples, the SL-repeater 1104 may be configured by the base station 1102 to transmit S-SSB. SL-nodes receiving the S-SSB from the SL-repeater 1104 may discover the synchronization source is the SL-repeater 1104, e.g., via one or more reserved S-PSS and S-SSS sequences. The SL-nodes may report their identity to the SL-repeater 1104 (e.g., via SL RACH) and/or to the base station 1102 as part of discovery.

Figure 12:
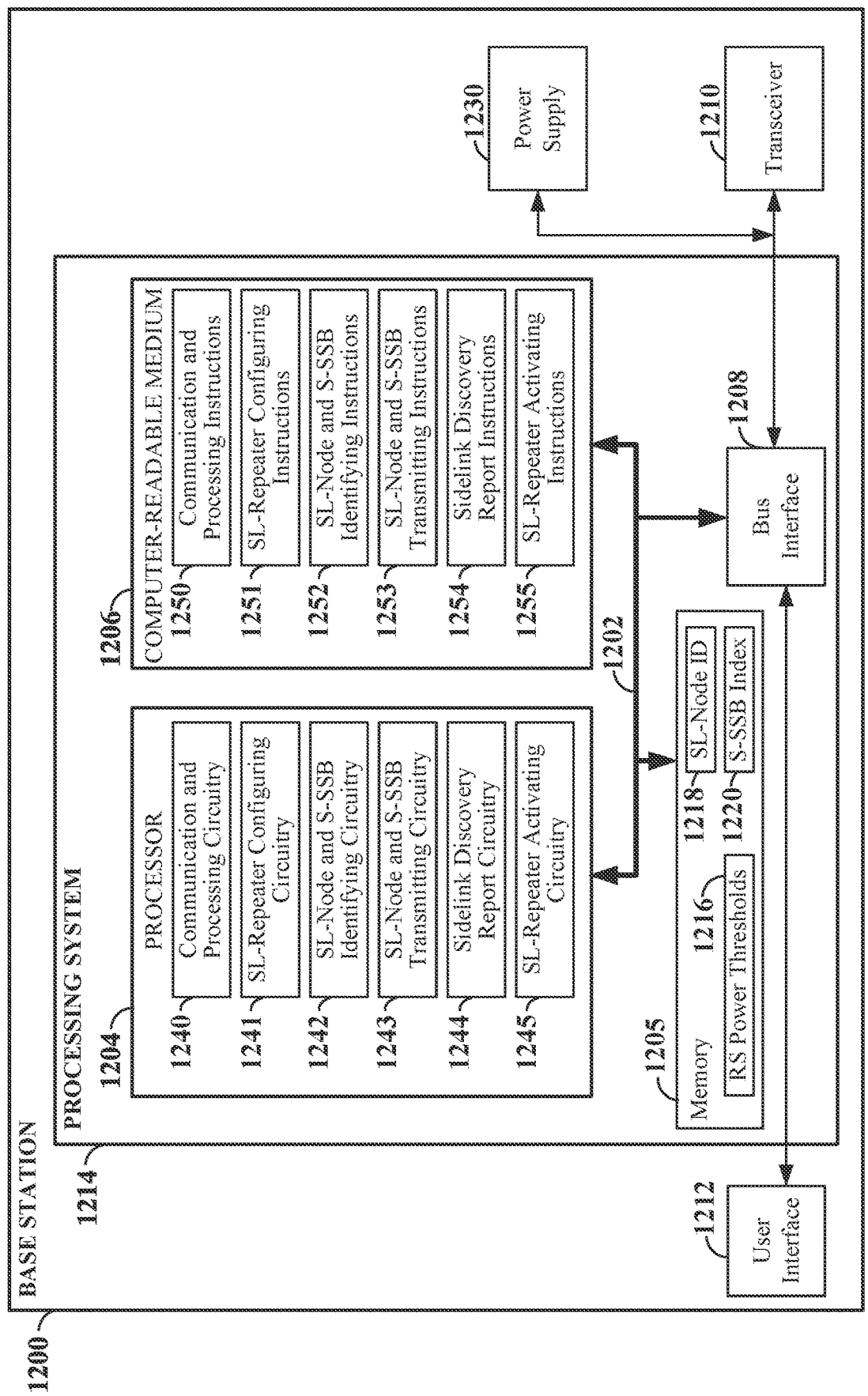
FIG. 12 is a block diagram illustrating an example of a hardware implementation of a base station employing a processing system according to some aspects.

FIG. 12 is a block diagram illustrating an example of a hardware implementation of a base station 1200 (e.g., a gNB) employing a processing system 1214. For example, the base station 1200 may correspond to any base station or scheduling entity configured for wireless communication, as shown and described above with reference to FIGS. 1, 3, 6-10, and/or 11.

The base station 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1200 may be configured to perform any one or more of the functions described herein. The processor 1204, as utilized in the base station 1200, may be used to implement any one or more of the processes and procedures described below.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits, including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art and will not be described any further.

A bus interface 1208 provides an interface between the bus 1202, a transceiver 1210, and a power source 1230. The transceiver 1210 provides a communication interface or a means for communicating with various other apparatus over a transmission medium (e.g., air interface). Depending upon the nature of the apparatus, a user interface 1212 (e.g., keypad, display, touch screen, speaker, microphone, control knobs, etc.) may also be provided. Of course, such a user interface 1212 is optional, and may be omitted in some examples.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store one or more sets of RS power threshold values 1216. SL-node IDs 1218, and/or S-SSB indices 1220, which may be used by the processor 1204 in generating and/or processing sidelink transmissions, conducting sidelink-repeater discovery operations, and the other aspects described herein.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. In some examples, the computer-readable medium 1206 may be part of the memory 1205. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include communication and processing circuitry 1240, configured to communicate with one or more UEs via a cellular (Uu) interface and with one or more sidelink-repeater devices via a cellular (Uu) interface and/or via a sidelink (PC5) interface. In addition, the communication and processing circuitry 1240 may be configured to communicate with another network entity (e.g., another base station, such as s gNB or eNB) via a Uu link. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1240 may include one or more transmit/receive chains.

In some implementations where the communication involves receiving information, the communication and processing circuitry 1240 may obtain information from a component of the base station 1200 (e.g., from the transceiver 1210 that receives the information via radio frequency signaling or some other type of signaling suitable for the applicable communication medium), process (e.g., decode) the information, and output the processed information. For example, the communication and processing circuitry 1240 may output the information to another component of the processor 1204, to the memory 1205, or to the bus interface 1208. In some examples, the communication and processing circuitry 1240 may receive one or more of signals, messages, other information, or any combination thereof. In some examples, the communication and processing circuitry 1240 may receive information via one or more channels. In some examples, the communication and processing circuitry 1240 may include functionality for a means for receiving. In some examples, the communication and processing circuitry 1240 may include functionality for a means for processing, including a means for demodulating, a means for decoding, etc.

In some implementations where the communication involves sending (e.g., transmitting) information, the communication and processing circuitry 1240 may obtain information (e.g., from another component of the processor 1204, the memory 1205, or the bus interface 1208), process (e.g., modulate, encode, etc.) the information, and output the processed information. For example, the communication and processing circuitry 1240 may output the information to the transceiver 1210 (e.g., that transmits the information via radio frequency signaling or some other type of signaling suitable for the applicable communication medium). In some examples, the communication and processing circuitry 1240 may send one or more of signals, messages, other information, or any combination thereof. In some examples, the communication and processing circuitry 1240 may send information via one or more channels. In some examples, the communication and processing circuitry 1240 may include functionality for a means for sending (e.g., a means for transmitting). In some examples, the communication and processing circuitry 1240 may include functionality for a means for generating, including a means for modulating, a means for encoding, etc.

In some examples, the communication and processing circuitry 1240 may be configured to receive/transmit sidelink scheduling information scheduling a sidelink transmission between transmitting and receiving sidelink devices, such as a sidelink-repeater (e.g., SL-repeater), a programmable logic controller (PLC), and/or a sidelink-node (SL-node). The scheduling information may include, for example, scheduled resources for the sidelink transmission and/or a cast type (e.g., unicast, groupcast, or broadcast) of the sidelink transmission. The scheduled resources may include, for example, frequency resources and time resources allocated for the sidelink transmission. The sidelink scheduling information may be received, for example, via downlink control information (DCI) format 3_0. Sidelink Mode 1 and Mode 2 may be supported.

The processor 1204 may further include sidelink (SL)-repeater configuring circuitry 1241, configured for example to transmit a message to a SL-repeater, configuring the SL-repeater to transmit sidelink synchronization signal blocks (S-SSBs) including a plurality of S-SSB index numbers. In some examples, the SL-repeater configuring circuitry 1241 may be configured, for example, to transmit a first message configuring a sidelink SL-repeater to broadcast a sidelink discovery message. According to some aspects, the SL-repeater configuring circuitry 1241 may further be configured to receive a sidelink transmission/reception request from a SL-node and transmit the first message in response to receiving the sidelink transmission/reception request from the SL-node. According to some examples, the first message may indicate a physical uplink shared channel (PUSCH) resource to convey the sidelink discovery report to the base station. In some examples, the sidelink discovery message may limit sidelink discovery to SL-nodes located within a predetermined range of the SL-repeater. In some examples, the sidelink discovery message may limit sidelink discovery to SL-nodes having measured reference signal (RS) power values greater than a predefined RS power threshold value. In some aspects, the predefined RS power threshold value of a respective SL-node may be based on a power class (PC) of the respective SL-node. In other aspects, the sidelink discovery message may limit sidelink discovery to SL-nodes identified on a list of SL-nodes provided by the base station. The SL-repeater configuring circuitry 1241 may further be configured to execute SL-repeater configuring instructions 1251 (e.g., software) stored in the computer-readable medium 1206 to implement one or more of the functions described herein.

The processor 1204 may further include SL-node and sidelink-synchronization signal block (S-SSB) identifying circuitry 1242, configured, for example, to receive a SL-node identification and a preferred S-SSB index number of a plurality of S-SSB index numbers associated with a SL-repeater. According to some aspects, the SL-node identification and the preferred S-SSB index number of the plurality of S-SSB numbers may be received from the SL-node. According to some aspects, the S-SSB may include sidelink capability information of the SL-repeater. The SL-node and S-SSB identifying circuitry 1242 may further be configured to execute SL-node and S-SSB identifying instructions 1252 (e.g., software) stored in the computer-readable medium 1206 to implement one or more of the functions described herein.

The processor 1204 may further include SL-node and S-SSB transmitting circuitry 1243, configured for various functions including, for example, transmitting the SL-node identification and the preferred S-SSB index number to the SL-repeater. In addition, according to some aspects, the SL-node and S-SSB transmitting circuitry 1243 may also be configured to transmit a measurement report received from the SL-node to the SL-repeater. In some examples, the SL-node and S-SSB transmitting circuitry 1243 may also receive an indication that a first one of the one of the one or more SL-nodes experienced a link failure with a programmable logic controller and may transmit the second message activating the SL-repeater for sidelink communication with only the first one of the one or more SL-nodes in response to receiving the indication that the first one of the one or more SL-nodes experienced the link failure with the programmable logic controller. The SL-node and S-SSB transmitting circuitry 1243 may further be configured to execute SL-node and S-SSB transmitting instructions 1253 (e.g., software) stored in the computer-readable medium 1206 to implement one or more of the functions described herein.

The processor 1204 may still further include sidelink discovery report circuitry 1244, configured for various functions, including receiving a sidelink discovery report from the SL-repeater identifying one or more SL-nodes discovered by the SL-repeater. The sidelink discovery report circuitry 1244 may also be involved with granting a physical uplink shared channel (PUSCH) resource to the SL-repeater in response to engaging in a random access channel (RACH) procedure with, or responding to a scheduling request (SR) from, the SL-repeater. The sidelink discovery report circuitry 1244 may thereafter obtain the sidelink discovery report on the PUSCH resource. The sidelink discovery report circuitry 1244 may further be configured to execute sidelink discovery report instructions 1254 (e.g., software) stored in the computer-readable medium 1206 to implement one or more of the functions described herein.

The processor 1204 may still further include SL-repeater activating circuitry, configured for various functions including, for example, transmitting a second message activating the SL-repeater for sidelink communication with the one or more SL-nodes. In other examples, the SL-repeater activating circuitry 1245 may activate the SL-repeater for sidelink communication with the SL-node. In still other examples, the SL-repeater activating circuitry 1245 may activate the SL-repeater for sidelink communication with the SL-node in response to receiving an indication that the SL-node has lost a sidelink (PC5) to a programmable logic controller. In yet examples, the SL-repeater activating circuitry 1245 may activate the SL-repeater, for sidelink communication with the SL-node. In other examples the SL-repeater activating circuitry 1245 may activate the SL-repeater for sidelink communication with the SL-node in response to receiving an indication that the SL-node has lost a sidelink (PC5) to a programmable logic controller. The SL-repeater activating circuitry 1245 may further be configured to execute SL-repeater activating instructions 1255 (e.g., software) stored in the computer-readable medium 1206 to implement one or more of the functions described herein.

Figure 13:
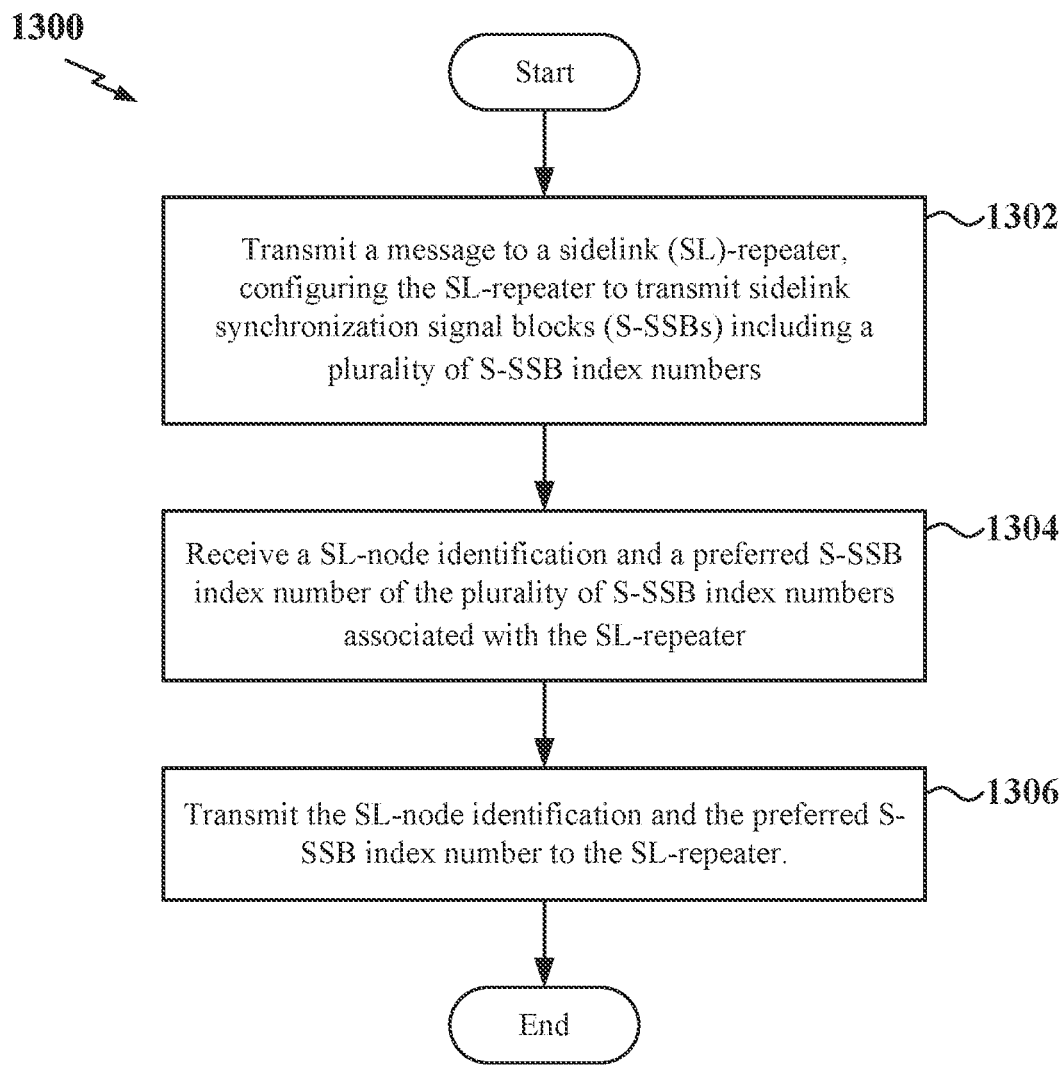
FIG. 13 is a flow chart of an exemplary method of sidelink-repeater discovery in sidelink at a base station according to some aspects.

FIG. 13 is a flow chart of an exemplary method 1300 of sidelink-repeater discovery in sidelink at a base station according to some aspects. As described below, some or all illustrated features may be omitted in a particular implementation within the scope of the present disclosure, and some illustrated features may not be required for implementation of all examples. In some examples, the method may be performed by the base station 1200, as described above and illustrated in FIG. 12, by a processor or processing system, or by any suitable means for carrying out the described functions.

At block 1302, the base station may transmit a message to a sidelink (SL)-repeater, configuring the SL-repeater to transmit sidelink synchronization signal blocks (S-SSBs) including a plurality of S-SSB index numbers. In some examples, the S-SSB includes sidelink capability information of the SL-repeater. For example, the communication and processing circuitry 1240 and the transceiver 1210 in combination with the SL-repeater configuring circuitry 1241, shown and described above in connection with FIG. 12, may provide a means for transmitting a message to a sidelink (SL)-repeater, configuring the SL-repeater to transmit sidelink synchronization signal blocks (S-SSBs) including a plurality of S-SSB index numbers.

At block 1304, the base station may receive a SL-node identification and a preferred S-SSB index number of the plurality of S-SSB index numbers associated with the SL-repeater. In some examples, the SL-node identification and the preferred S-SSB index number of the plurality of S-SSB numbers may be received from the SL-node. For example, the communication and processing circuitry 1240 and transceiver 1210 in combination with the SL-node and S-SSB identifying circuitry 1242, shown and described above in connection with FIG. 12, may provide a means for receiving a SL-node identification and a preferred S-SSB index number of the plurality of S-SSB index numbers associated with the SL-repeater.

At block 1306, the base station may transmit the SL-node identification and the preferred S-SSB index number to the SL-repeater. In one example, the base station may also transmit a measurement report received from the SL-node to the SL-repeater. For example, the communication and processing circuitry 1240 and transceiver 1210 in combination with the SL-node and S-SSB transmitting circuitry 1243, shown and described above in connection with FIG. 12, may provide a means for transmitting the SL-node identification and the preferred S-SSB index number to the SL-repeater.

Figure 14:
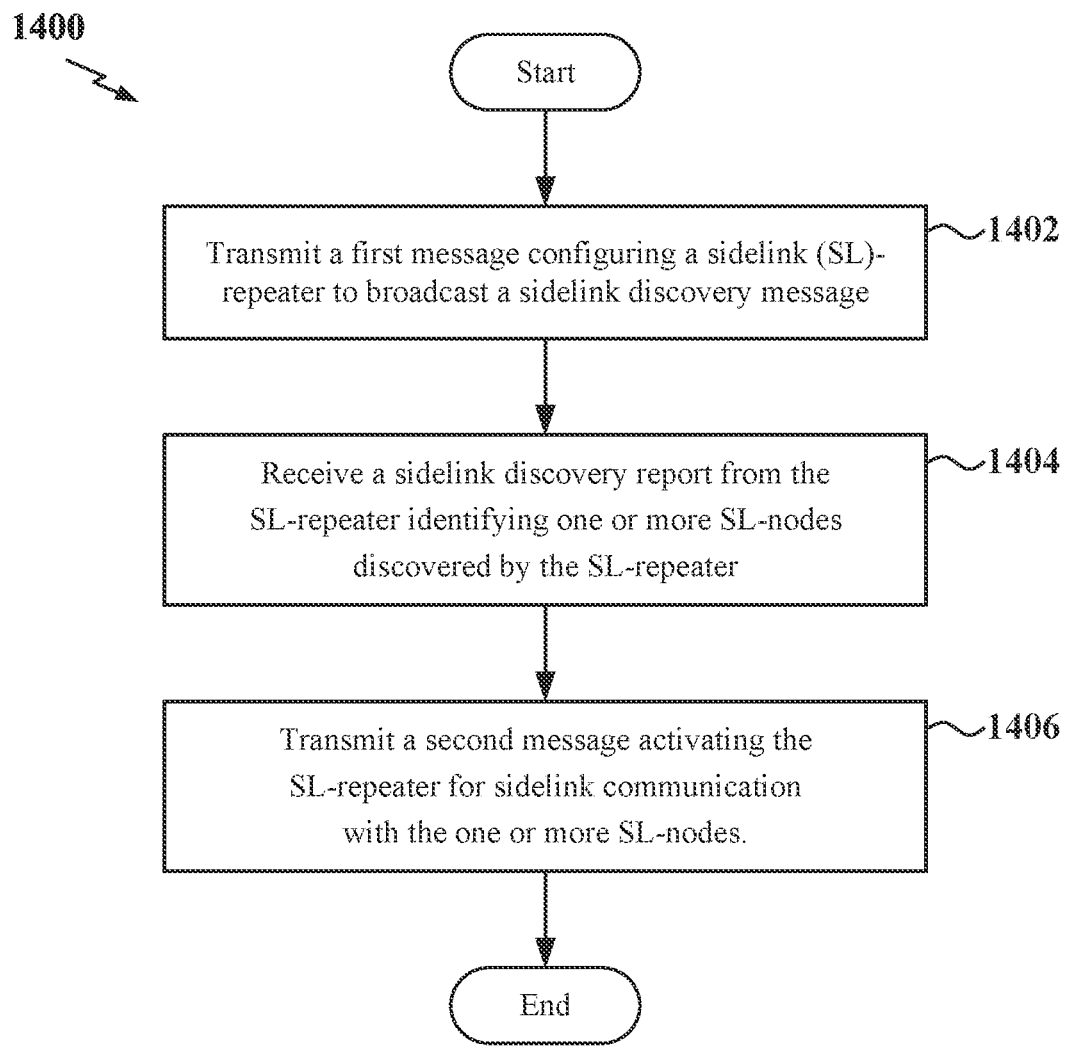
FIG. 14 is a flow chart of an exemplary method of sidelink-repeater discovery in sidelink at a base station according to some aspects.

FIG. 14 is a flow chart of an exemplary method 1400 of sidelink-repeater discovery in sidelink at a base station according to some aspects. As described below, some or all illustrated features may be omitted in a particular implementation within the scope of the present disclosure, and some illustrated features may not be required for implementation of all examples. In some examples, the method may be performed by the base station 1200, as described above and illustrated in FIG. 12, by a processor or processing system, or by any suitable means for carrying out the described functions.

At block 1402, the base station may transmit a message to a sidelink (SL)-repeater, configuring the SL-repeater to transmit sidelink synchronization signal blocks (S-SSBs), including a plurality of S-SSB index numbers. In some examples, the S-SSB includes sidelink capability information of the SL-repeater. The base station may receive a sidelink transmission/reception request from an SL-node in one example. In such an example, the base station may transmit the first message in response to receiving the SL-node's sidelink transmission/reception request. For example, the communication and processing circuitry 1240 and the transceiver 1210 in combination with the SL-node and S-SSB transmitting circuitry 1243, shown and described above in connection with FIG. 12, may provide a means for transmitting a message to a sidelink (SL)-repeater, configuring the SL-repeater to transmit sidelink synchronization signal blocks (S-SSBs) including a plurality of S-SSB index numbers.

At block 1404, the base station may receive a sidelink discovery report from the SL-repeater identifying one or more SL-nodes discovered by the SL-repeater. In one example, the base station may grant a physical uplink shared channel (PUSCH) resource to the SL-repeater in response to engaging in a random access channel (RACH) procedure with or responding to a scheduling request (SR) from the SL-repeater. After successfully concluding the RACH process or scheduling request, the base station may obtain the sidelink discovery report on the PUSCH resource. For example, the communication and processing circuitry 1240 and the transceiver 1210 in combination with the sidelink discovery report circuitry 1244, shown and described above in connection with FIG. 12, may provide a means for receiving a sidelink discovery report from the SL-repeater identifying one or more SL-nodes discovered by the SL-repeater.

At block 1406, the base station may transmit a second message activating the SL-repeater for sidelink communication with the one or more SL-nodes. In one example, the base station may receive an indication that a first one of the one of the one or more SL-nodes experienced a link failure with a programmable logic controller. In such an example, the base station may transmit the second message activating the SL-repeater for sidelink communication with only the first one of the one or more SL-nodes in response to receiving the indication that the first one of the one or more SL-nodes experienced the link failure with the programmable logic controller. For example, the communication and processing circuitry 1240 and the transceiver 1210 in combination with the SL-repeater activating circuitry 1245 may provide a means for transmitting a second message activating the SL-repeater for sidelink communication with the one or more SL-nodes.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one of the FIGS. 1, 3, and/or 6-11, and utilizing, for example, the processes and/or algorithms described herein in relation to FIGs. 7, 9, 11, 13, and/or 14.

Figure 15:
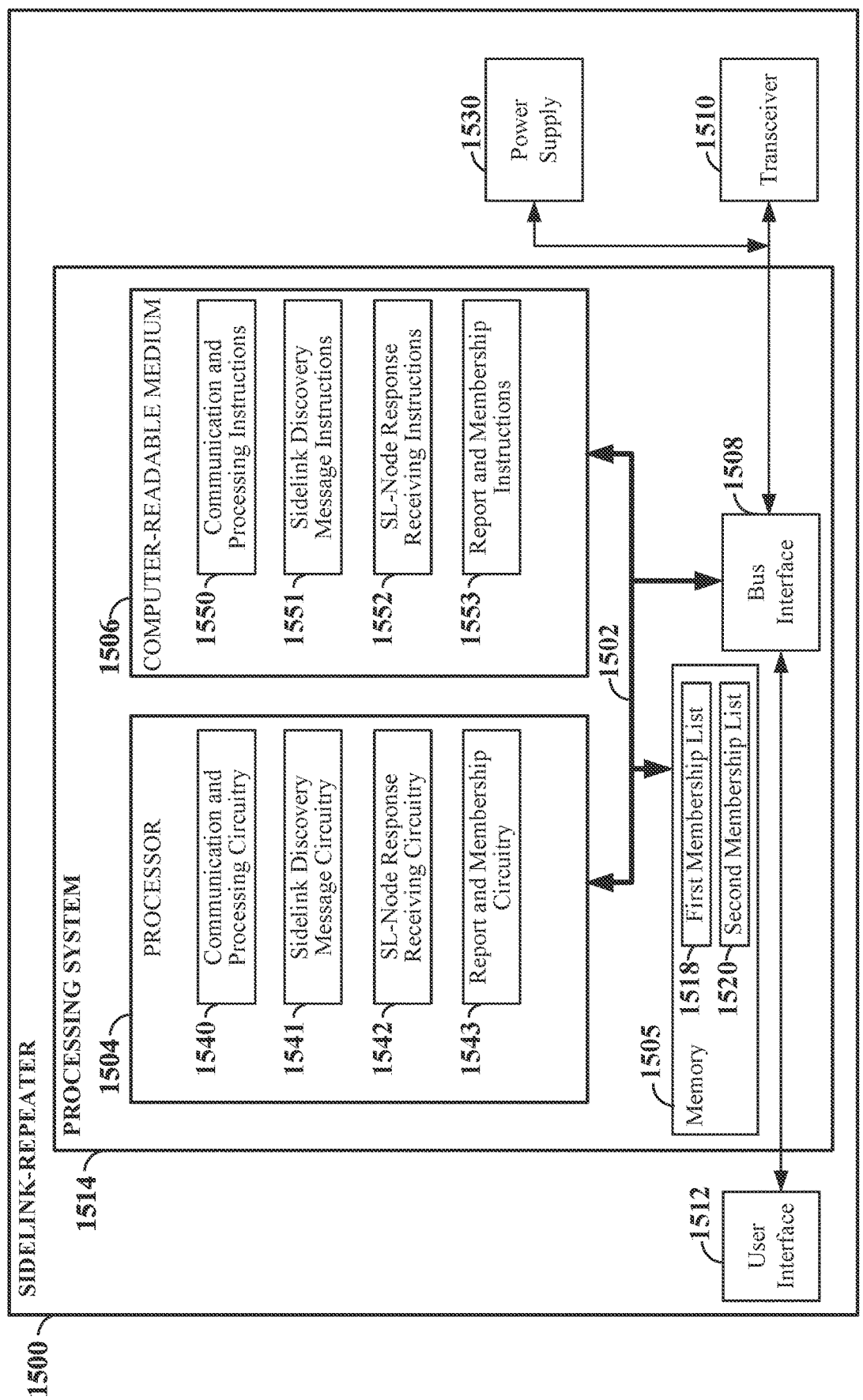
FIG. 15 is a block diagram illustrating an example of a hardware implementation of an exemplary sidelink-repeater employing a processing system according to some aspects.

FIG. 15 is a block diagram illustrating an example of a hardware implementation of an exemplary sidelink-repeater 1500, employing a processing system 1514. For example, the sidelink-repeater 1500 may generally correspond to any of the base stations (e.g., gNBs) of UEs shown in any one or more of FIGS. 1, 3, and/or 6-11. However, with particularity, the exemplary sidelink-repeater 1500 may most closely correspond to the SL-repeater 607 of FIG. 6, 704 of FIG. 7, 807 of FIG. 8, 904 of FIG. 9, 1007 of FIG. 6, and/or 1104 of FIG. 11.

In accordance with various aspects of the disclosure, an element, or any portion of an element, or any combination of elements may be implemented with a processing system 1514 that includes one or more processors 1504. The processing system 1514 may be substantially the same as the processing system 1214 illustrated in FIG. 12, including a bus interface 1508, a bus 1502, memory 1505, a processor 1504, and a computer-readable medium 1506. Furthermore, the sidelink-repeater 1500 may include an optional user interface 1512 and a transceiver 1510. The processor 1504, as utilized in a sidelink-repeater 1500, may be used to implement any one or more of the processes described below.

The processor 1504 may include communication and processing circuitry 1540 configured to communicate with sidelink (SL)-nodes (e.g., sensors/actuators, UEs, etc.), IIoT infrastructure and devices, programmable logic controllers (PLCs), base stations (e.g., gNBs), etc. Communication may be via cellular (Uu) links, sidelink (PC5), or any other wireless communication, such as WiFi, Bluetooth, WiMAX, and others. In some examples, the communication and processing circuitry 1540 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1540 may include one or more transmit/receive chains.

In some implementations where the communication involves receiving information, the communication and processing circuitry 1544 may obtain information from a component of the sidelink-repeater 1500 (e.g., from the transceiver 1510 that receives the information via radio frequency signaling or some other type of signaling suitable for the applicable communication medium), process (e.g., decode) the information, and output the processed information. For example, the communication and processing circuitry 1540 may output the information to another component of the processor 1504, to the memory 1505, or to the bus interface 1508. In some examples, the communication and processing circuitry 1540 may receive one or more of signals, messages, other information, or any combination thereof. In some examples, the communication and processing circuitry 1540 may receive information via one or more channels. In some examples, the communication and processing circuitry 1540 may include functionality for a means for receiving. In some examples, the communication and processing circuitry 1540 may include functionality for a means for processing, including a means for demodulating, a means for decoding, etc.

The communication and processing circuitry 1540 may be configured to transmit sidelink scheduling information, scheduling a sidelink transmission from a transmitting wireless communication device to a receiving wireless communication device to at least the transmitting wireless communication device. The scheduling information may include, for example, scheduled resources for the sidelink transmission and/or a cast type (e.g., unicast, groupcast, or broadcast) of the sidelink transmission. The sidelink scheduling information may be transmitted, for example, via downlink control information (DCI) format 3_0. In some examples, the communication and processing circuitry 1540 may store the scheduling information 6 within, for example, memory 1505. Sidelink Mode 1 and Mode 2 may be supported.

In some implementations where the communication involves sending (e.g., transmitting) information, the communication and processing circuitry 1540 may obtain information (e.g., from another component of the processor 1504, the memory 1505, or the bus interface 1508), process (e.g., modulate, encode, etc.) the information, and output the processed information. For example, the communication and processing circuitry 1540 may output the information to the transceiver 1510 (e.g., that transmits the information via radio frequency signaling or some other type of signaling suitable for the applicable communication medium). In some examples, the communication and processing circuitry 1540 may send one or more of signals, messages, other information, or any combination thereof. In some examples, the communication and processing circuitry 1540 may send information via one or more channels. In some examples, the communication and processing circuitry 1540 may include functionality for a means for sending (e.g., a means for transmitting). In some examples, the communication and processing circuitry 1540 may include functionality for a means for generating, including a means for modulating, a means for encoding, etc.

The processor 1504 may include sidelink discovery message circuitry 1541, configured to perform various functions such as transmitting a sidelink discovery message. The sidelink discovery message circuitry 1541 may also transmit a sidelink discovery message in response to an instruction generated autonomously by the SL-repeater. In some examples, the sidelink discovery message circuitry 1541 may transmit the sidelink discovery message in response to a sidelink discovery request received from a first SL-node of the one or more respectively responding SL-nodes. In some aspects, the sidelink discovery message may place limits on sidelink discovery. For example, the sidelink discovery message may limit discovery responses to SL-nodes with measured reference signal (RS) power values greater than a predefined RS power threshold value. In one aspect, the predefined RS power threshold value of a respective SL-node may be based on a power class (PC) of the respective SL-node. The sidelink discovery message circuitry 1541 may further be configured to execute sidelink discovery message instructions 1551 (e.g., software) stored in the computer-readable medium 1506 to implement one or more of the functions described herein.

The processor 1504 may include SL-node response receiving circuitry 1542, configured to perform various functions such as receiving one or more first responses from one or more respectively responding SL-nodes, in response to transmitting the sidelink discovery message. The SL-node response receiving circuitry 1542 may further be configured to execute SL-node response receiving instructions 1552 (e.g., software) stored in the computer-readable medium 1506 to implement one or more of the functions described herein.

The processor 1504 may include report and membership circuitry 1543, configured to perform various functions such as transmitting a report to a base station identifying a change in membership between a first list of the one or more respectively responding SL-nodes and a second list of previously responding SL-nodes. According to some aspects, the report and membership circuitry 1543 may identify a change in membership in response to determining that a specific SL-node is identified on the second list that is not identified on the first list. According to some aspects, the report and membership circuitry 1543 may identify a change in membership in response to determining that the first quantity of SL-nodes, which are identified on the first list and not identified on the second list, exceeds a predetermined threshold. According to some aspects, the report and membership circuitry 1543 may identify a change in membership in response to determining that the second quantity of SL-nodes, which are identified on the second list and not identified on the first list, exceeds a predetermined second threshold. In other aspects, the report and membership circuitry 1543 may identify a change in membership in response to determining that a first SL-node on the first list is associated with a traffic priority that exceeds a predetermined traffic priority threshold. The report and membership circuitry 1543 may further be configured to execute report and membership instructions 1553 (e.g., software) stored in the computer-readable medium 1506 to implement one or more of the functions described herein.

Figure 16:
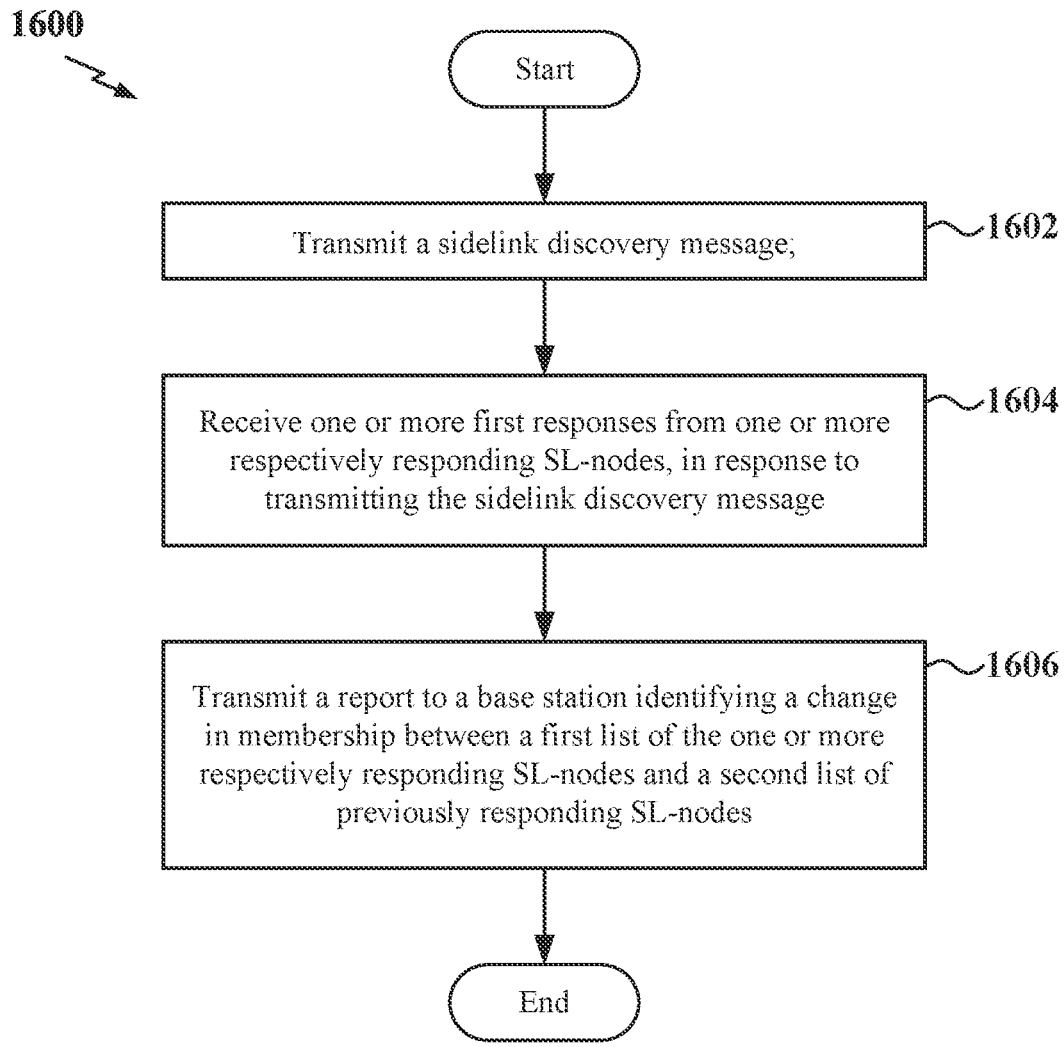
FIG. 16 is a flow chart of an exemplary method of sidelink-repeater discovery in sidelink at a sidelink-repeater according to some aspects.

FIG. 16 is a flow chart of an exemplary method 1600 of sidelink-repeater discovery in sidelink at a sidelink-repeater according to some aspects. As described below, some or all illustrated features may be omitted in a particular implementation within the scope of the present disclosure, and some illustrated features may not be required for implementation of all examples. In some examples, the method may be performed by the sidelink-repeater 1500, as described above and illustrated in FIG. 15, by a processor or processing system, or by any suitable means for carrying out the described functions.

At block 1602, the sidelink-repeater may transmit a sidelink discovery message. In some examples, the sidelink-repeater may transmit the sidelink discovery message in response to an instruction generated autonomously by the SL-repeater. In some examples, the sidelink-repeater may transmit the sidelink discovery message in response to a sidelink discovery request received from a first SL-node of the one or more respectively responding SL-nodes. In some aspects, the sidelink discovery message limits sidelink discovery to SL-nodes having measured reference signal (RS) power values that are greater than a predefined RS power threshold value. In other aspects, the predefined RS power threshold value of a respective SL-node is based on a power class (PC) of the respective SL-node. For example, the communication and processing circuitry 1240 and the transceiver 1210 in combination with sidelink discovery message circuitry 1541, shown and described above in connection with FIG. 15, may provide a means for transmitting a sidelink discover message.

At block 1604, the sidelink-repeater may receive one or more first responses from one or more respectively responding SL-nodes, in response to transmitting the sidelink discovery message. For example, the communication and processing circuitry 1540 and the transceiver 1510, in combination with SL-node response receiving circuitry 1542, shown and described above in connection with FIG. 15, may provide a means for receiving one or more first responses from one or more respectively responding SL-nodes, in response to transmitting the sidelink discovery message.

At block 1606, the sidelink-repeater may transmit a report to a base station identifying a change in membership between a first list of the one or more respectively responding SL-nodes and a second list of previously responding SL-nodes. In some examples, the sidelink-repeater may identify the change in membership in response to determining that a specific SL-node identified on the second list that is not identified on the first list. In some examples, the sidelink-repeater may identify the change in membership in response to determining that a first quantity of SL-nodes, which are identified on the first list and not identified on the second list, exceeds a predetermined threshold. In some examples, the sidelink-repeater may identify the change in membership in response to determining that a second quantity of SL-nodes, which are identified on the second list and not identified on the first list, exceeds a predetermined second threshold. In still other examples, the sidelink-repeater may identify the change in membership in response to determining that a first SL-node on the first list is associated with a traffic priority that exceeds a predetermined traffic priority threshold. For example, the communication and processing circuitry 1240 and the transceiver 1210 in combination with report and membership circuitry 1543, shown and described above in connection with FIG. 15, may provide a means for transmitting a report to a base station identifying a change in membership between a first list of the one or more respectively responding SL-nodes and a second list of previously responding SL-nodes.

Of course, in the above examples, the circuitry included in the processor 1504 is merely provided as an example, and other means for carrying out the described functions may be included within various aspects of the present disclosure, including but not limited to the instructions stored in the computer-readable medium 1506, or any other suitable apparatus or means described in any one of the FIGS. 1, 3, and/or 6-11, and utilizing, for example, the processes and/or algorithms described herein in relation to FIGs. 7, 9, 11, 13, 14, and/or 16.

The following provides an overview of aspects of the present disclosure:

Aspect 1: A base station for wireless communication, comprising: a transceiver, a memory, and a processor communicatively coupled to the transceiver and the memory, the processor and the memory being configured to: transmit a message to a sidelink (SL)-repeater, configuring the SL-repeater to transmit sidelink synchronization signal blocks (S-SSBs) including a plurality of S-SSB index numbers, receive a SL-node identification and a preferred S-SSB index number of the plurality of S-SSB index numbers associated with the SL-repeater, and transmit the SL-node identification and the preferred S-SSB index number to the SL-repeater.

Aspect 2: The base station of aspect 1, wherein the SL-node identification and the preferred S-SSB index number of the plurality of S-SSB numbers are received from the SL-node.

Aspect 3: The base station of aspect 1 or 2, wherein the processor and the memory are further configured to: activate the SL-repeater for sidelink communication with the SL-node.

Aspect 4: The base station of any of aspects 1 through 3, wherein the processor and the memory are further configured to: activate the SL-repeater for sidelink communication with the SL-node in response to receiving an indication that the SL-node has lost a sidelink (PC5) to a programmable logic controller.

Aspect 5: The base station of any of aspects 1 through 4, wherein the S-SSB includes sidelink capability information of the SL-repeater.

Aspect 6: The base station of any of aspects 1 through 5, wherein the processor and the memory are further configured to: transmit a measurement report received from the SL-node to the SL-repeater.

Aspect 7: A method of wireless communication at a base station, comprising: transmitting a message to a sidelink (SL)-repeater, configuring the SL-repeater to transmit sidelink synchronization signal blocks (S-SSBs) including a plurality of S-SSB index numbers, receiving a SL-node identification and a preferred S-SSB index number of the plurality of S-SSB index numbers associated with the SL-repeater, and transmitting the SL-node identification and the preferred S-SSB index number to the SL-repeater.

Aspect 8: The method of aspect 7, wherein the SL-node identification and the preferred S-SSB index number of the plurality of S-SSB numbers are received from the SL-node.

Aspect 9: The method of aspect 7 or 8, further comprising: activating the SL-repeater for sidelink communication with the SL-node.

Aspect 10: The method of any of aspects 7 through 9, further comprising: activating the SL-repeater for sidelink communication with the SL-node in response to receiving an indication that the SL-node has lost a sidelink (PC5) to a programmable logic controller.

Aspect 11: The method of any of aspects 7 through 10, wherein the S-SSB includes sidelink capability information of the SL-repeater.

Aspect 12: The method of any of aspects 7 through 11, further comprising: transmitting a measurement report received from the SL-node to the SL-repeater.

Aspect 13: A base station for wireless communication, comprising: a transceiver, a memory, and a processor communicatively coupled to the transceiver and the memory, the processor and the memory being configured to: transmit a first message configuring a sidelink (SL)-repeater to broadcast a sidelink discovery message, receive a sidelink discovery report from the SL-repeater identifying one or more SL-nodes discovered by the SL-repeater; and transmit a second message activating the SL-repeater for sidelink communication with the one or more SL-nodes.

Aspect 14: The base station of aspect 13, wherein the processor and the memory are further configured to: receive a sidelink transmission/reception request from a SL-node, and transmit the first message in response to receiving the sidelink transmission/reception request from the SL-node.

Aspect 15: The base station of aspect 13 or 14, wherein the processor and the memory are further configured to: receive an indication that a first one of the one of the one or more SL-nodes experienced a link failure with a programmable logic controller, and transmit the second message activating the SL-repeater for sidelink communication with only the first one of the one or more SL-nodes in response to receiving the indication that the first one of the one or more SL-nodes experienced the link failure with the programmable logic controller.

Aspect 16: The base station of any of aspects 13 through 15, wherein the sidelink discovery message limits sidelink discovery to SL-nodes located within a predetermined range of the SL-repeater.

Aspect 17: The base station of any of aspects 13 through 16, wherein the sidelink discovery message limits sidelink discovery to SL-nodes having measured reference signal (RS) power values that are greater than a predefined RS power threshold value.

Aspect 18: The base station of any of aspects 13 through 17, wherein the predefined RS power threshold value of a respective SL-node is based a power class (PC) of the respective SL-node.

Aspect 19: The base station of any of aspects 13 through 18, wherein the sidelink discovery message limits sidelink discovery to SL-nodes identified on a list of SL-nodes provided by the base station.

Aspect 20: The base station of any of aspects 13 through 19, wherein the first message indicates a physical uplink shared channel (PUSCH) resource to be utilized to convey the sidelink discovery report to the base station.

Aspect 21: The base station of any of aspects 13 through 20, further comprising: granting a physical uplink shared channel (PUSCH) resource to the SL-repeater in response to engaging in a random access channel (RACH) procedure with, or responding to a scheduling request (SR) from, the SL-repeater, and obtaining the sidelink discovery report on the PUSCH resource.

Aspect 22: A sidelink (SL)-repeater for wireless communication, comprising: a transceiver, a memory, and a processor communicatively coupled to the transceiver and the memory, the processor and the memory being configured to: transmit a sidelink discovery message, receive one or more first responses from one or more respectively responding SL-nodes, in response to transmitting the sidelink discovery message, and transmit a report to a base station identifying a change in membership between a first list of the one or more respectively responding SL-nodes and a second list of previously responding SL-nodes.

Aspect 23: The SL-repeater of aspect 22, wherein the processor and the memory are further configured to: transmit the sidelink discovery message in response to an instruction generated autonomously by the SL-repeater.

Aspect 24: The SL-repeater of aspect 22 or 23, wherein the processor and the memory are further configured to:

transmit the sidelink discovery message in response to a sidelink discovery request received from a first SL-node of the one or more respectively responding SL-nodes.

Aspect 25: The SL-repeater of any of aspects 22 through 24, wherein the processor and the memory are further configured to: identify the change in membership in response to determining that a specific SL-node identified on the second list that is not identified on the first list.

Aspect 26: The SL-repeater of any of aspects 22 through 25, wherein the processor and the memory are further configured to: identify the change in membership in response to determining that a first quantity of SL-nodes, that are identified on the first list and not identified on the second list, exceeds a predetermined threshold.

Aspect 27: The SL-repeater of any of aspects 22 through 26, wherein the processor and the memory are further configured to: identify the change in membership in response to determining that a second quantity of SL-nodes, that are identified on the second list and not identified on the first list, exceeds a predetermined second threshold.

Aspect 28: The SL-repeater of any of aspects 22 through 27, wherein the processor and the memory are further configured to: identify the change in membership in response to determining that a first SL-node on the first list is associated with a traffic priority that exceeds a predetermined traffic priority threshold.

Aspect 29: The SL-repeater of any of aspects 22 through 28, wherein the sidelink discovery message limits sidelink discovery to SL-nodes having measured reference signal (RS) power values that are greater than a predefined RS power threshold value.

Aspect 30: The base station of any of aspects 22 through 29, wherein the predefined RS power threshold value of a respective SL-node is based on a power class (PC) of the respective SL-node.

Aspect 31: A base station for wireless communication comprising at least one means for performing a method of any one of aspects 7 through 12.

Aspect 32: A non-transitory computer-readable medium storing computer-executable code, comprising code for causing a base station to perform a method of any one of aspects 7 through 12.

Aspect 33: A method of wireless communication at a base station, the method comprising performing the method configured to the processor and memory of any one of aspects 13 through 21.

Aspect 34: A base station for wireless communication comprising at least one means for performing the method configured to the processor and memory of any one of aspects 13 through 21.

Aspect 35: A non-transitory computer-readable medium storing computer-executable code, comprising code for causing a base station to perform the method configured to the processor and memory of any one of aspects 13 through 21.

Aspect 36: A method of wireless communication at a sidelink (SL)-repeater, the method comprising performing the method configured to the processor and memory of any one of aspects 22 through 30.

Aspect 34: A sidelink (SL)-repeater for wireless communication comprising at least one means for performing the method configured to the processor and memory of any one of aspects 22 through 30.

Aspect 35: A non-transitory computer-readable medium storing computer-executable code, comprising code for causing a sidelink (SL)-repeater for wireless communication to perform the method configured to the processor and memory of any one of aspects 22 through 30.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20. Ultra-Wideband (UWB), Bluetooth, and/or other suitable systems (where IEEE stands for Institute of Electrical and Electronics Engineers). The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1, 3, 6-12 and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. The construct A and/or B is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A network entity for wireless communication, comprising:
   one or more transceivers;
   one or more memories; and
   one or more processors coupled to the one or more transceivers and the one or more memories, the one or more processors being configured to:
      transmit a message to a sidelink (SL)-repeater, configuring the SL-repeater to transmit a SL discovery message including sidelink synchronization signal blocks (S-SSBs) including a plurality of S-SSB index numbers;
      receive, from a SL-node, a SL-node identification and a preferred S-SSB index number of the plurality of S-SSB index numbers associated with the SL-repeater; and
      transmit the SL-node identification and the preferred S-SSB index number to the SL-repeater,
      wherein a sidelink discovery between the SL-repeater and the SL-node is transparent to the SL-repeater and the SL-node.

2. The network entity of claim 1, wherein the SL-node identification and the preferred S-SSB index number of the plurality of S-SSB index numbers are received from the SL-node.

3. The network entity of claim 1, wherein the one or more processors are further configured to:
   activate the SL-repeater for sidelink communication with the SL-node.

4. The network entity of claim 1, wherein the one or more processors are further configured to:
   activate the SL-repeater for sidelink communication with the SL-node in response to receiving an indication that the SL-node has lost a sidelink (PC5) to a programmable logic controller.

5. The network entity of claim 1, wherein the S-SSB includes sidelink capability information of the SL-repeater.

6. The network entity of claim 1, wherein the one or more processors are further configured to:
   transmit a measurement report received from the SL-node to the SL-repeater.

7. A method of wireless communication at a network entity, comprising:
   transmitting a message to a sidelink (SL)-repeater, configuring the SL-repeater to transmit a SL discovery message including sidelink synchronization signal blocks (S-SSBs) including a plurality of S-SSB index numbers;
   receiving, from a SL-node, a SL-node identification and a preferred S-SSB index number of the plurality of S-SSB index numbers associated with the SL-repeater; and
   transmitting the SL-node identification and the preferred S-SSB index number to the SL-repeater,
   wherein a sidelink discovery between the SL-repeater and the SL-node is transparent to the SL-repeater and the SL-node.

8. The method of claim 7, wherein the SL-node identification and the preferred S-SSB index number of the plurality of S-SSB index numbers are received from the SL-node.

9. The method of claim 7, further comprising:
   activating the SL-repeater for sidelink communication with the SL-node.

10. The method of claim 7, further comprising:
    activating the SL-repeater for sidelink communication with the SL-node in response to receiving an indication that the SL-node has lost a sidelink (PC5) to a programmable logic controller.

11. The method of claim 7, wherein the S-SSB includes sidelink capability information of the SL-repeater.

12. The method of claim 7, further comprising:
    transmitting a measurement report received from the SL-node to the SL-repeater.

13. A network entity for wireless communication, comprising:
    one or more transceivers;
    one or more memories; and
    one or more processors coupled to the one or more transceivers and the one or more memories, the one or more processors being configured to:
       transmit a first message configuring a sidelink (SL)-repeater to broadcast a sidelink discovery message;
       receive a sidelink discovery report from the SL-repeater identifying one or more SL-nodes discovered by the SL-repeater; and
       transmit a second message activating the SL-repeater for sidelink communication with the one or more SL-nodes,
       wherein a sidelink discovery between the SL-repeater and the one or more SL-nodes is transparent to the SL-repeater and the one or more SL-nodes.

14. The network entity of claim 13, wherein the one or more processors are further configured to:
    receive a sidelink transmission/reception request from a SL-node; and
    transmit the first message in response to receiving the sidelink transmission/reception request from the SL-node.

15. The network entity of claim 13, wherein the one or more processors are further configured to:
    receive an indication that a first one of the one or more SL-nodes experienced a link failure with a programmable logic controller; and
    transmit the second message activating the SL-repeater for sidelink communication with only the first one of the one or more SL-nodes in response to receiving the indication that the first one of the one or more SL-nodes experienced the link failure with the programmable logic controller.

16. The network entity of claim 13, wherein the sidelink discovery message limits the sidelink discovery to SL-nodes located within a predetermined range of the SL-repeater.

17. The network entity of claim 13, wherein the sidelink discovery message limits the sidelink discovery to SL-nodes having measured reference signal (RS) power values that are greater than a predefined RS power threshold value.

18. The network entity of claim 17, wherein the predefined RS power threshold value of a respective SL-node is based a power class (PC) of the respective SL-node.

19. The network entity of claim 13, wherein the sidelink discovery message limits the sidelink discovery to SL-nodes identified on a list of SL-nodes provided by the network entity.

20. The network entity of claim 13, wherein the first message indicates a physical uplink shared channel (PUSCH) resource to be utilized to convey the sidelink discovery report to the network entity.

21. The network entity of claim 13, wherein the one or more processors are further configured to:
grant a physical uplink shared channel (PUSCH) resource to the SL-repeater in response to engaging in a random access channel (RACH) procedure with, or responding to a scheduling request (SR) from, the SL-repeater; and
obtain the sidelink discovery report on the PUSCH resource.

22. A sidelink (SL)-repeater for wireless communication, comprising:
one or more transceive r;
one or more memories; and
one or more processors coupled to the one or more transceivers and the one or more memories, the one or more processors being configured to:
transmit a sidelink discovery message;
receive one or more first responses from one or more respectively responding SL-nodes, in response to transmitting the sidelink discovery message; and
transmit a report to a network entity identifying a change in membership between a first list of the one or more respectively responding SL-nodes and a second list of previously responding SL-nodes,
wherein a sidelink discovery between the SL-repeater and the one or more respectively responding SL-nodes is transparent to the SL-repeater and the one or more respectively responding SL-nodes.

23. The SL-repeater of claim 22, wherein the one or more processors are further configured to:
transmit the sidelink discovery message in response to an instruction generated autonomously by the SL-repeater.

24. The SL-repeater of claim 22, wherein the one or more processors are further configured to:
transmit the sidelink discovery message in response to a sidelink discovery request received from a first SL-node of the one or more respectively responding SL-nodes.

25. The SL-repeater of claim 22, wherein the one or more processors are further configured to:
identify the change in membership in response to determining that a specific SL-node identified on the second list that is not identified on the first list.

26. The SL-repeater of claim 22, wherein the one or more processors are further configured to:
identify the change in membership in response to determining that a first quantity of SL-nodes, that are identified on the first list and not identified on the second list, exceeds a predetermined threshold.

27. The SL-repeater of claim 22, wherein the one or more processors are further configured to:
identify the change in membership in response to determining that a second quantity of SL-nodes, that are identified on the second list and not identified on the first list, exceeds a predetermined second threshold.

28. The SL-repeater of claim 22, wherein the one or more processors are further configured to:
identify the change in membership in response to determining that a first SL-node on the first list is associated with a traffic priority that exceeds a predetermined traffic priority threshold.

29. The SL-repeater of claim 22, wherein the sidelink discovery message limits the sidelink discovery to SL-nodes having measured reference signal (RS) power values that are greater than a predefined RS power threshold value.

30. The SL-repeater of claim 29, wherein the predefined RS power threshold value of a respective SL-node is based on a power class (PC) of the respective SL-node.

* * * * *